(12) United States Patent
Chin

(10) Patent No.: US 8,174,503 B2
(45) Date of Patent: *May 8, 2012

(54) TOUCH-BASED AUTHENTICATION OF A MOBILE DEVICE THROUGH USER GENERATED PATTERN CREATION

(75) Inventor: David H. Chin, Menlo Park, CA (US)

(73) Assignee: David H. Cain, Menlo Park, CA (US)

( * ) Notice: Subject to any disclaimer, the term of this patent is extended or adjusted under 35 U.S.C. 154(b) by 916 days.

This patent is subject to a terminal disclaimer.

(21) Appl. No.: 12/122,667

(22) Filed: May 17, 2008

(65) Prior Publication Data

US 2009/0284482 A1 Nov. 19, 2009

(51) Int. Cl.
*G06F 3/041* (2006.01)
(52) U.S. Cl. .................. 345/173; 345/156; 715/863
(58) Field of Classification Search .................. 345/173; 715/863
See application file for complete search history.

(56) References Cited

U.S. PATENT DOCUMENTS

| | | |
|---|---|---|
| 5,193,668 A | 3/1993 | Fukuchi et al. |
| 5,406,307 A | 4/1995 | Hirayama et al. |
| 5,455,599 A | 10/1995 | Cabral et al. |
| 5,465,084 A | 11/1995 | Cottrell |
| 5,481,721 A | 1/1996 | Serlet et al. |
| 5,483,261 A | 1/1996 | Yasutake |
| 5,519,867 A | 5/1996 | Moeller et al. |
| 5,543,897 A | 8/1996 | Altrieth, III |
| 5,559,961 A | 9/1996 | Blonder |
| 5,566,337 A | 10/1996 | Szymanski et al. |
| 5,596,656 A | 1/1997 | Goldberg |
| 5,610,380 A | 3/1997 | Nicolaisen |
| 5,677,710 A | 10/1997 | Thompson-Rohrlich |
| 5,796,183 A | 8/1998 | Hourmand |
| 5,821,933 A | 10/1998 | Keller et al. |
| 5,848,105 A | 12/1998 | Gardner et al. |
| 5,907,327 A | 5/1999 | Ogura et al. |
| 5,915,131 A | 6/1999 | Knight et al. |
| 5,920,726 A | 7/1999 | Anderson |

(Continued)

FOREIGN PATENT DOCUMENTS

AU 9464298 A 5/1999

(Continued)

OTHER PUBLICATIONS

Appleinsider Staff, New Apple filing details virtual input touch-screen interface, Feb. 21, 2006, http://www.appleinsider.com/articles/06/02/21/new_apple_filing_details_virtual_input_touch_screen_interface.html (last visited Dec. 6, 2008).

A. G. Hauptmann, Speech and gestures for graphic image manipulation,1989, http://portal.acm.org/citation.cfm?id=67496(last visited Dec. 6, 2008).

Anastasios A. Economides and Nick Nikolaou, Evaluation of Handheld Devices for Mobile Learning, http://www.conta.uom.gr/conta/publications/PDF/Evaluation%20of%20Handheld%20Devices%20for%20Mobile%20Learning.pdf (last visited Dec. 6, 2008).

(Continued)

*Primary Examiner* — Quan-Zhen Wang
*Assistant Examiner* — Troy Dalrymple
(74) *Attorney, Agent, or Firm* — Raj Abhyanker, P.C.

(57) ABSTRACT

A method, system, and apparatus of a touch-based authentication of a mobile device through user generated pattern creation are disclosed. In one embodiment, a method of a mobile device includes recognizing a tactile force on a touch screen without a visual aid as an unlocking gesture, storing the unlocking gesture to a memory of the mobile device, associating another tactile force on the touch screen with the unlocking gesture, and transforming the mobile device from an initial state to an unlocked state based on the association between the another tactile force and the unlocking gesture. The method may include transforming the mobile device to operate as a telephonic communication device in the unlocked state.

16 Claims, 12 Drawing Sheets

U.S. PATENT DOCUMENTS

| | | |
|---|---|---|
| 5,923,908 A | 7/1999 | Schrock et al. |
| 5,929,852 A | 7/1999 | Fisher et al. |
| 5,946,647 A | 8/1999 | Miller et al. |
| 5,969,705 A | 10/1999 | Fisher et al. |
| 6,151,208 A | 11/2000 | Bartlett |
| 6,160,540 A | 12/2000 | Fishkin et al. |
| 6,160,555 A | 12/2000 | Kang et al. |
| 6,181,328 B1 | 1/2001 | Shieh et al. |
| 6,192,478 B1 | 2/2001 | Elledge |
| 6,209,104 B1 | 3/2001 | Jalili |
| 6,243,080 B1 | 6/2001 | Molne |
| 6,249,606 B1 | 6/2001 | Kiraly et al. |
| 6,275,983 B1 | 8/2001 | Orton et al. |
| 6,298,146 B1 | 10/2001 | Ilan et al. |
| 6,323,846 B1 | 11/2001 | Westerman et al. |
| 6,343,263 B1 | 1/2002 | Nichols et al. |
| 6,347,290 B1 | 2/2002 | Bartlett |
| 6,405,060 B1 | 6/2002 | Schroeder et al. |
| 6,411,285 B1 | 6/2002 | Miyazawa |
| 6,421,453 B1 | 7/2002 | Kanevsky et al. |
| 6,424,354 B1 | 7/2002 | Matheny et al. |
| 6,476,797 B1 | 11/2002 | Kurihara et al. |
| 6,570,557 B1 | 5/2003 | Westerman et al. |
| 6,573,883 B1 | 6/2003 | Bartlett |
| 6,597,345 B2 | 7/2003 | Hirshberg |
| 6,633,310 B1 | 10/2003 | Andrew et al. |
| 6,668,081 B1 | 12/2003 | Ilan et al. |
| 6,677,932 B1 | 1/2004 | Westerman |
| 6,720,860 B1 | 4/2004 | Narayanaswami |
| 6,735,695 B1 | 5/2004 | Gopalakrishnan et al. |
| 6,788,809 B1 | 9/2004 | Grzeszczuk et al. |
| 6,862,687 B1 | 3/2005 | Suzuki |
| 7,004,394 B2 | 2/2006 | Kim |
| 7,006,077 B1 | 2/2006 | Uusimaki |
| 7,030,861 B1 | 4/2006 | Westerman et al. |
| 7,053,887 B2 | 5/2006 | Kraus et al. |
| 7,095,401 B2 | 8/2006 | Liu et al. |
| 7,096,454 B2 | 8/2006 | Damm et al. |
| 7,124,433 B2 | 10/2006 | Little |
| 7,151,843 B2 | 12/2006 | Rui et al. |
| 7,157,649 B2 | 1/2007 | Hill |
| 7,174,462 B2 | 2/2007 | Pering et al. |
| 7,231,231 B2 | 6/2007 | Kokko et al. |
| 7,263,670 B2 | 8/2007 | Rekimoto |
| 7,292,230 B2 | 11/2007 | Tokkonen |
| 7,295,191 B2 | 11/2007 | Kraus et al. |
| 7,313,120 B2 | 12/2007 | Ekberg et al. |
| 7,315,793 B2 | 1/2008 | Jean |
| RE40,153 E | 3/2008 | Westerman et al. |
| 7,339,580 B2 | 3/2008 | Westerman et al. |
| 7,362,331 B2 | 4/2008 | Ording |
| 7,383,453 B2 | 6/2008 | Youngs |
| 7,403,837 B2 | 7/2008 | Graiger et al. |
| 7,411,575 B2 | 8/2008 | Hill et al. |
| 7,469,381 B2 | 12/2008 | Ording |
| 7,479,949 B2 | 1/2009 | Jobs et al. |
| 7,657,849 B2 | 2/2010 | Chaudhri et al. |
| 7,683,888 B1 | 3/2010 | Kennedy |
| 2001/0011308 A1 | 8/2001 | Clark et al. |
| 2001/0012022 A1 | 8/2001 | Smith |
| 2002/0015024 A1 | 2/2002 | Westerman et al. |
| 2002/0029341 A1 | 3/2002 | Juels et al. |
| 2002/0132634 A1 | 9/2002 | Hiltunen |
| 2002/0158838 A1 | 10/2002 | Smith |
| 2002/0196274 A1 | 12/2002 | Comfort et al. |
| 2003/0117376 A1 | 6/2003 | Ghulam |
| 2003/0142138 A1 | 7/2003 | Brown et al. |
| 2004/0012572 A1 | 1/2004 | Sowden et al. |
| 2004/0030934 A1 | 2/2004 | Mizoguchi et al. |
| 2004/0034801 A1 | 2/2004 | Jaeger |
| 2004/0085351 A1 | 5/2004 | Tokkonen |
| 2004/0088568 A1 | 5/2004 | Tokkonen |
| 2004/0204129 A1 | 10/2004 | Payne et al. |
| 2004/0230843 A1 | 11/2004 | Jansen |
| 2004/0250138 A1 | 12/2004 | Schneider |
| 2004/0252727 A1 | 12/2004 | Mousseau et al. |
| 2004/0260955 A1 | 12/2004 | Mantyla |
| 2004/0268267 A1 | 12/2004 | Moravcsik |
| 2005/0050477 A1 | 3/2005 | Robertson et al. |
| 2005/0052427 A1 | 3/2005 | Wu et al. |
| 2005/0057522 A1 | 3/2005 | Godler |
| 2005/0060554 A1 | 3/2005 | O'Donoghue |
| 2005/0079896 A1 | 4/2005 | Kokko et al. |
| 2005/0162402 A1 | 7/2005 | Watanachote et al. |
| 2005/0210417 A1 | 9/2005 | Marvit et al. |
| 2005/0212756 A1 | 9/2005 | Marvit et al. |
| 2005/0212911 A1 | 9/2005 | Marvit et al. |
| 2005/0216862 A1 | 9/2005 | Shinohara et al. |
| 2005/0237308 A1 | 10/2005 | Autio et al. |
| 2005/0248542 A1 | 11/2005 | Sawanobori |
| 2005/0253817 A1 * | 11/2005 | Rytivaara et al. ............. 345/173 |
| 2005/0264833 A1 | 12/2005 | Hiraoka et al. |
| 2006/0012577 A1 | 1/2006 | Kyrola |
| 2006/0022956 A1 | 2/2006 | Lengeling et al. |
| 2006/0097991 A1 | 5/2006 | Hotelling et al. |
| 2006/0101354 A1 | 5/2006 | Hashimoto et al. |
| 2006/0109252 A1 | 5/2006 | Kolmykov-Zotov et al. |
| 2006/0117197 A1 | 6/2006 | Nurmi |
| 2006/0132460 A1 | 6/2006 | Zotov et al. |
| 2006/0174339 A1 | 8/2006 | Tao |
| 2006/0232567 A1 | 10/2006 | Westerman et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0267955 A1 | 11/2006 | Hino |
| 2006/0286966 A1 | 12/2006 | Musto |
| 2006/0294472 A1 | 12/2006 | Cheng et al. |
| 2007/0020601 A1 | 1/2007 | Wang et al. |
| 2007/0061126 A1 | 3/2007 | Russo et al. |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0078919 A1 | 4/2007 | Westerman et al. |
| 2007/0081726 A1 | 4/2007 | Westerman et al. |
| 2007/0119698 A1 | 5/2007 | Day |
| 2007/0139395 A1 | 6/2007 | Westerman et al. |
| 2007/0146335 A1 | 6/2007 | Hsieh et al. |
| 2007/0150826 A1 | 6/2007 | Anzures et al. |
| 2007/0150842 A1 * | 6/2007 | Chaudhri et al. ............. 715/863 |
| 2007/0152984 A1 | 7/2007 | Ording et al. |
| 2007/0177803 A1 | 8/2007 | Elias et al. |
| 2007/0177804 A1 | 8/2007 | Elias et al. |
| 2007/0205988 A1 | 9/2007 | Gloyd et al. |
| 2007/0205992 A1 | 9/2007 | Gloyd et al. |
| 2007/0236466 A1 | 10/2007 | Hotelling |
| 2007/0236470 A1 | 10/2007 | Abanami et al. |
| 2007/0268267 A1 | 11/2007 | Chang |
| 2007/0290628 A1 | 12/2007 | Altonen et al. |
| 2008/0006454 A1 | 1/2008 | Hotelling |
| 2008/0007532 A1 | 1/2008 | Chen |
| 2008/0007533 A1 | 1/2008 | Hotelling |
| 2008/0007535 A1 | 1/2008 | Li |
| 2008/0007539 A1 | 1/2008 | Hotelling |
| 2008/0018617 A1 | 1/2008 | Ng et al. |
| 2008/0034292 A1 | 2/2008 | Brunner et al. |
| 2008/0036743 A1 | 2/2008 | Westerman et al. |
| 2008/0055257 A1 | 3/2008 | Peng |
| 2008/0072172 A1 | 3/2008 | Shinohara et al. |
| 2008/0082934 A1 | 4/2008 | Kocienda et al. |
| 2008/0094356 A1 | 4/2008 | Ording et al. |
| 2008/0094368 A1 | 4/2008 | Ording et al. |
| 2008/0094369 A1 | 4/2008 | Ganatra et al. |
| 2008/0094370 A1 | 4/2008 | Ording et al. |
| 2008/0094371 A1 | 4/2008 | Forstall et al. |
| 2008/0098331 A1 | 4/2008 | Novick et al. |
| 2008/0122796 A1 | 5/2008 | Jobs et al. |
| 2008/0158170 A1 | 7/2008 | Herz et al. |
| 2008/0163130 A1 | 7/2008 | Westerman |
| 2008/0165136 A1 | 7/2008 | Christie et al. |
| 2008/0165141 A1 | 7/2008 | Christie |
| 2008/0165142 A1 | 7/2008 | Kocienda et al. |
| 2008/0165143 A1 | 7/2008 | Tolmasky et al. |
| 2008/0165144 A1 | 7/2008 | Forstall et al. |
| 2008/0165145 A1 | 7/2008 | Herz et al. |
| 2008/0165147 A1 | 7/2008 | Christie et al. |

| | | | |
|---|---|---|---|
| 2008/0165148 A1 | 7/2008 | Williamson et al. | |
| 2008/0165149 A1 | 7/2008 | Platzer et al. | |
| 2008/0165151 A1 | 7/2008 | Lemay et al. | |
| 2008/0165152 A1 | 7/2008 | Forstall et al. | |
| 2008/0165153 A1 | 7/2008 | Platzer et al. | |
| 2008/0165157 A1 | 7/2008 | Fu et al. | |
| 2008/0165159 A1 | 7/2008 | Soss et al. | |
| 2008/0165160 A1 | 7/2008 | Kocienda et al. | |
| 2008/0165255 A1 | 7/2008 | Christie et al. | |
| 2008/0168290 A1 | 7/2008 | Jobs et al. | |
| 2008/0168349 A1 | 7/2008 | Lamiraux et al. | |
| 2008/0168353 A1 | 7/2008 | Anzures et al. | |
| 2008/0168361 A1 | 7/2008 | Forstall et al. | |
| 2008/0168365 A1 | 7/2008 | Chaudhri | |
| 2008/0168395 A1 | 7/2008 | Ording et al. | |
| 2008/0168396 A1 | 7/2008 | Matas et al. | |
| 2008/0168404 A1 | 7/2008 | Ording | |
| 2008/0168405 A1 | 7/2008 | Tolmasky et al. | |
| 2008/0174570 A1 | 7/2008 | Jobs et al. | |
| 2008/0180408 A1 | 7/2008 | Forstall et al. | |
| 2008/0191898 A1 | 8/2008 | Janik | |
| 2008/0198141 A1 | 8/2008 | Lee et al. | |
| 2008/0211778 A1 | 9/2008 | Ording et al. | |
| 2008/0220752 A1 | 9/2008 | Forstall et al. | |
| 2008/0229255 A1 | 9/2008 | Linjama et al. | |
| 2008/0259042 A1 | 10/2008 | Thorn | |
| 2008/0278455 A1 | 11/2008 | Atkins et al. | |
| 2009/0085877 A1 | 4/2009 | Chang | |
| 2009/0249232 A1 | 10/2009 | Lundy et al. | |
| 2009/0315848 A1 | 12/2009 | Ku et al. | |

FOREIGN PATENT DOCUMENTS

| | | |
|---|---|---|
| AU | 743522 B | 1/2002 |
| AU | 2007902519 | 5/2007 |
| CN | 1271432 T | 10/2000 |
| DE | 19703404 A | 8/1997 |
| DE | 197 24 278 A1 | 1/1998 |
| DE | 198 48 501 A1 | 5/2000 |
| DE | 19848501 A1 | 5/2000 |
| DE | 69812141 D | 8/2003 |
| DE | 102 28 568 A1 | 1/2004 |
| DE | 10228568 A1 | 1/2004 |
| EP | 0546704 A3 | 8/1993 |
| EP | 0 668 657 A1 | 8/1995 |
| EP | 0668657 A1 | 8/1995 |
| EP | 0677801 A | 10/1995 |
| EP | 0668657 B1 | 7/1998 |
| EP | 1027639 A1 | 8/2000 |
| EP | 1 284 450 A2 | 2/2003 |
| EP | 1284450 A2 | 2/2003 |
| EP | 1027639 B1 | 3/2003 |
| EP | 1 037 136 A3 | 11/2003 |
| EP | 1037136 A3 | 11/2003 |
| EP | 1 076 281 B1 | 3/2005 |
| EP | 1076281 B2 | 3/2005 |
| EP | 0 996 228 B1 | 4/2005 |
| EP | 1 037 136 B1 | 4/2005 |
| EP | 0996228 B1 | 4/2005 |
| EP | 1037136 B1 | 4/2005 |
| GB | 2313460 A | 11/1997 |
| GB | 2 353 184 A | 2/2001 |
| GB | 2353184 A | 2/2001 |
| GB | 2 358 777 A | 8/2001 |
| GB | 2358777 A | 8/2001 |
| JP | 60171560 | 9/1985 |
| JP | 2249062 | 10/1990 |
| JP | 7295673 A | 10/1995 |
| JP | 08171442 A2 | 7/1996 |
| JP | 08171442 A2 | 7/1996 |
| JP | 11203045 | 7/1999 |
| JP | 11203045 A | 7/1999 |
| JP | 11203045 A | 9/1999 |
| JP | 11126191 A | 11/1999 |
| JP | 2000322199 A2 | 11/2000 |
| JP | 2002082734 A | 3/2002 |
| JP | 2002082734 A2 | 3/2002 |
| JP | 2003058302 A | 2/2003 |
| JP | 2003058302 A | 3/2003 |
| JP | 2005100391 A | 4/2005 |
| JP | 2005100391 A | 4/2005 |
| SG | 24112 A | 2/1996 |
| TW | 406222 B | 9/2000 |
| WO | 9921073 | 4/1999 |
| WO | 9921073 A1 | 4/1999 |
| WO | PCT/JP-1998/004745 | 4/1999 |
| WO | PCT/US-1999/001146 | 7/1999 |
| WO | 0177792 A2 | 10/2001 |
| WO | PCT/DK-2001/000204 | 10/2001 |
| WO | 0233882 A1 | 4/2002 |
| WO | PCT/IB-2002/000623 | 9/2003 |
| WO | PCT/IF-2003/000485 | 12/2003 |
| WO | 2004021108 A2 | 3/2004 |
| WO | PCT/US-2005/030968 | 4/2006 |
| WO | PCT/EP-2006/060211 | 9/2006 |
| WO | PCT/EP-2006/006594 | 1/2007 |
| WO | PCT/US-2006/028317 | 2/2007 |
| WO | PCT/IB-2006/003727 | 6/2007 |
| WO | 2006062759 | 7/2007 |
| WO | PCT/US-2006/061370 | 7/2007 |
| WO | PCT/US-2006/062759 | 7/2007 |
| WO | PCT/US-2007/001611 | 8/2007 |
| WO | PCT/US-2007/010870 | 11/2007 |
| WO | 2007077777 | 3/2008 |
| WO | PCT/US-2007/077776 | 3/2008 |
| WO | PCT/US-2007/077777 | 3/2008 |
| WO | PCT/US-2007/026182 | 7/2008 |
| WO | PCT/US-2007/089161 | 7/2008 |
| WO | PCT/US-2007/089162 | 7/2008 |
| WO | PCT/US-2007/089172 | 7/2008 |
| WO | 2008138030 | 11/2008 |
| WO | 2009003542 | 1/2009 |
| WO | 2009120925 A2 | 1/2009 |
| WO | 0102088 A1 | 2/2010 |

OTHER PUBLICATIONS

Andrew D. Wilson, TouchLight: an imaging touch screen and display for gesture-based interaction, http://portal.acm.org/citatio.cfm?id=1027933.1027946(last visited Dec. 6, 2008).

Antti Pirhonen, Stephen Brewster, Christopher Holguin, Gestural and audio metaphors as a means of control for mobile devices, 2002, p. 291-298, Conference on Human Factors in Computing Systems, ACM, New York, http://portal.acm.org/citation.cfm?doid=503376.503428 (last visited Dec. 6, 2008).

Appleinsider Staff, Handwriting recognition interface appears in iPhone Software 2.0, May 5, 2008, http://www.appleinsider.com/articles/08/05/05/handwriting_recognition_interface_appears_in_iphone_software_2_0.html (last visited Dec. 6, 2008).

Jansen, W., "Authenticating Users on Handheld Devices," The National Institute of Standards and Technology, Gaithersburg, Maryland, 2003, 13 pages. (last visited Jul. 19, 2010).

Jermyn, I. et al., "The Design and Analysis of Graphical Passwords," Submission to the 8th USENIX Security Symposium, Aug. 1999, 15 pages. (last visited Jul. 19, 2010).

Monrose, N., "Towards Stronger User Authentication," Ph.d dissertation, 1999, New York University, vol. 60/05-B of Dissertation Abstract International, Order No. AAD99-30229, 1 15 pages. (last visited Jul. 19, 2010).

Najjar, L., "Graphical Passwords," International Technology Disclosures vol. 10, No. 1, Jan. 25, 1992, 1 page. (last visited Jul. 19, 2010).

Bardram, J., "The Trouble with Login: on usability and computer security in Ubiquitous Computing," Centre for Pervasive Healthcare, Department of Computer Science, University of Aahus, Published online: Jul. 23, 2005. (last visited Jul. 19, 2010).

Renaud, K. et al., "My Password is Here! An Investigation into Visuo-Spatial Authentication Mechanisms," 2004, 25 pages, www.sciencedirect.com. (last visited Jul. 19, 2010).

Wiedenbeck, S., et al. "PassPoints: Design and Longitudinal Evaluation of a Graphical Password System," International Journal of Human-Computer Studies, Vol.63, Issues1-2, Jul. 2005, pp. 102-127. (last visited Jul. 19, 2010).

GridLock 1.32, Oct. 8, 2003, ppl-2, http://gridlock.en.softonic.com/palm. (last visited Jul. 19, 2010).

"A Passive-Style Buttonless Mobile Terminal"; Youichi Horry, Issyu Nakajima, Takeshi Hoshino, and Yukinobu Maruyama; IEEE Transactions on Consumer Electronics; vol. 49; No. 3; Aug. 2003; pp. 530-535. (last visited Jul. 19, 2010).

IBM COW., "Access/Control Icons (Icon Keys)," IBM Technical Disclosure Bulletin, vol. 38, No. 4, Apr. 1995, pp. 407-409. (last visited Jul. 19, 2010).

Touch Password Protection, JGUI Professional, http://www.jgui.net/touch/index.html. (last visited Jul. 19, 2010).

Apple Insider Staff, New Apple filing details virtual input touch screen interface, Feb. 21 2006, http://www.appleinsider.com/articles/06/02/21/new_apple_filing_details_virtual_input_touch_screen_interface.html (last visited Jul. 19, 2010).

A.G.Hauptmann, Speech and gestures for graphic image manipulation,1989, http://portal.acm.org/citation.cfm?id=37496. (last visited Jul. 19, 2010).

Anastasios A. Economides and Nick Nikolaou, Evaluation of Handheld Devices for Mobile Learning, http://www.conta.uom.gr/conta/publications/PDF/Evaluation%20of%20Handheld%20Devices%20for%20Mobile%20Learning.pdf. (last visited Jul. 19, 2010).

Andrew D. Wilson, ToughLight: an imaging touch screen and display for gesture-based interaction, http://portal.acm.org/citatio.cfm?id=1029733.1027946. (last visited Jul. 19, 2010).

Anti Pirhonen, Stephen Brewster, Christopher Holguin, Gestural and audio metaphors as a means of control for mobile devices,2002,p. 291-298; Conference on Human Factors in Computing Systems, ACM, New York, http://portal.acm.org/citation.cfm?doid=503376.503428, (last visited Jul. 19, 2010).

Appleinsider Staff, Handwriting recognition interface appears in iPhone Software 2.0, May 5, 2008, http://www.appleinsider.com/articles/08/05/handwriting_recognition_interface_in_iphone_software_2_0.html (last visited Jul. 19, 2010).

Appleinsider Staff, Mega Apple filing details next-gen 'multi-touch input surface', Feb. 21 2008, http://www.appleinsider.com/articles/08/02/21/mega_apple_filing_details_next_Gen_multi_touch_input_surface.html (last visited Jul. 19, 2010).

Arnold Kim, Apple Exploring MultiTouch Interface Gestures, Aug. 2, 2007, http://www.macrumors.com/2007/08/02/apple-exporing-multitouch-interface-gestures/ (last visited Jul. 19, 2010).

Arnold Kim, Synaptics ClearPad Technology, Fingerworks, iPhone?, Jan. 15, 2007, http://www.macrumors.com/2007/01/15/synaptics-clearpad-technology-fingerworks-iphone/ (last visited Jul. 19, 2010).

Graffiti (Palm OS), http://en.wikipedia.org/wiki/Graffiti_(Palm_OS) (last visited Jul. 19, 2010).

Gridlock 1.32, http://www.pdabusiness.com/gridlock/manual/manual.html (last visited Jul. 19, 2010).

Gustaf Eriskon, Application of intertial sensing to handheld terminals, Dec. 19, 2001, http://stureby.net/gustaf/thesis/ger-thesis-final.pdf (last visited Jul. 19, 2010).

Ivan Poupyrev et al., Ambient touch: designing tactile interfaces for handheld devices, 2002, http://portal.acm.org/citation.cfm?id=571985.571993 (last visited Jul. 19, 2010).

Ivan Poupyrev, Shigeaki Maruyama, Tactile Interface for Small Touch Screens, http://www.sonycsl.co.jp/person/poup/e-library/2003/uist2003_tactilesmaildisplay.pdf (last visited Jul. 19, 2010).

J.E.Bardram, The trouble with login: on usability and computer security in ubiquitous computing, http://www.springerlink.com/content/h1744q1332032788/ (last visited Jul. 19, 2010).

Elise Ackerman, As Google Continues to Work Out the Bugs in Android, Its Free Must-Have Operating System for Mobile Devices, Many Developers Are Asking: Where'S the Code? , Jan. 19, 2008, San Jose Mercury News, 1C.

Jukka Linjama, Jonna Hakkila, Sami Ronkainen, Gesture Interfaces for Mobile Devices—Minimalist Approach For Haptic Interaction, http://www.dcs.gla.uc.uk/haptic/haptics%20web%20pages_files/Linjama%20et%20a1..pdf (last visited Jul. 19, 2010).

Jun Rekimoto, Takaaki Ishizawa, Carsten Schwesig, Haruo Oba, PreSense: Interaction Techniques for Finger Sensing Input Devices, http://ftp.csl.sony.co.jp/person/rekimoto/papers/rekimoto-uist03.pdf (last visited Dec. 6, 2008).

Mark Nicholson et al., Pen-Based Gestures: An Approach to Reducing Screen Clutter in Mobile Computing, 2004, http://www.springerlink.com/content/6frruv841712e0h4/ (last visited Dec. 6, 2008).

Markus F.Peschl and Chris Stary, The Role of Cognitive Modeling for User Interface Design Representations: An Epistemological Analysis of Knowledge Engineering in the Contextof Human-Computer Interaction, http://www.springerlink.com/content/mum06835u6685168/ (last visited Dec. 6, 2008).

Michael Thoernlund, Gesture Analyzing for Multi-Touch Screen Interfaces, 2007, http://epubl.ltu.se/1404/5494/2007/30/LTU-HIP-EX-0730-SE.pdf (last visited Dec. 6, 2008).

New Apple Patents tablet; iPod-like UI elements, Feb. 2, 2006, http://hmpf.com/wordpress/48/new-apple-patents/ (last visited Dec. 6, 2008).

Paul Keir, John Payne, Jocelyn Elgoyhen, Martyn Horner, Martin Naef, Paul Anderson, Gesture-recognition with Non-Referenced Tracking, http:www2.computer.org/portal/web/csdl/doi/10.1109/VR.2006.64 (last visited Dec. 6, 2008).

R.Ricci, G.Shelter, M.V. Crispinoc, S.Jassimd, J.Koremane, M.Olivar-Dimasf, S.Garcia-Salicettig, P.Soria-Rodriguez, SecurePhone: a mobile phone with biometric authentication and e-signature support for dealing secure transactions on the fly, May 2, 2006, http://spiedl.aip.org/getabs/servlet/GetabsServlet?prog=normal&id=PSISDG006250000001625009000001&idtype=cvips&gifs=yes (last visited Dec. 6, 2008).

S O'Modhrain, Touch and GO-Designing Haptic Feedback for a Hand-Held Mobile Device, Jan. 3, 2005, http://www.springerlink.com/content/p543770h580m7844/ (last visited Dec. 6, 2008).

Sam Oliver, Apple details next-gen multi-touch techniques for tablet Macs, Aug. 28, 2008 http://www.appleinsider.com/articles/08/08/28/apples_details_next_gen_multi_touch_techniques_for_tablet_macs.html (last visited Dec. 6, 2008)

Sami Romkainen, Jonna Hakkila, Saana Kaleva, Ashley Colley, Jukka Linjama, Tap Input as an embedded interaction method for mobile devices,2007, http://portal.acm.org/citation.cfm?id=1226969.1227023 (last visited Dec. 6, 2008).

Shiguang Shan, Wen Gao, Xilin Chen, Bo Cao, Wenbin Zeng, A Face-Unlock Screen Saver by Using Face Verification Based on Identity-Specific Subspaces, http://www.jdl.ac.cn/user/sgshan/pub/Shan-PCM01.PDF (last visited Dec. 6, 2008).

Slash Lane, Apple filing spills details of advanced multi-touch pads for Macs, Feb. 19, 2008, http://www.appleinsider.com/articles/08/02/19/apple_filing_spills_details_of_advanced_multi_touch_pads_for_macs.html (last visited Dec. 6, 2008).

Stephen Brewster, Joanna Lumsden, Marek Bell, Malcolm Hall, Stuart Tasker, Multimodal 'eyes-free' interaction techniques for wearable devices, 2003, http://portal.acm.org/citation.cfm?id=642611.642694&type=series (last visited Dec. 6, 2008).

Susanna Pirttikangas, Ivan Sanchez, Mikko Kaupilla, Jukka Riekki, Comparison og Touch, Mobile Phone, and Gesture Based Controlling of Browser Applications on a Large Screen, http://www.pervasive2008.org/Papers/LBR/Ibr2.pdf (last visited Dec. 6, 2008).

Topi Kaaresoja, Lorna M. Brown, Jukka Linjama, Snap-Crackle-Pop: Tactile Feedback for Mobile Touch Screens, http://research.microsoft.com/~lomab/publications/kaaresoja_EH06.pdf (last visited Dec. 6, 2008).

Trenton Schulz, Using the Keystroke-Level Model to Evaluate Mobile Phones, http://apachepersonal.miun.se/~vivasp/IRIS31-019.pdf (last visited Dec. 6, 2008).

William R.Hamburgen, Deborah A. Wallach, Marc A. Viredaz, Lawrence S. Brakmo, Carl A. Waldspruger, Joel F. Bartlett, Timothy Mann, Keith I. Farkas Itsy: Stretching the Bounds of Mobile Computing, http://www2.computer.org/portal/web/csdl/doi/10.1109/2.917534 (last visited Dec. 6, 2008).

Sean Fallon, Google shows off Dream-Like Android Handset, Sep. 16, 2008, http://gizmodo.com/5050594/google-shows-off-dream+like-android-handset (last visited Dec. 6, 2008).

* cited by examiner

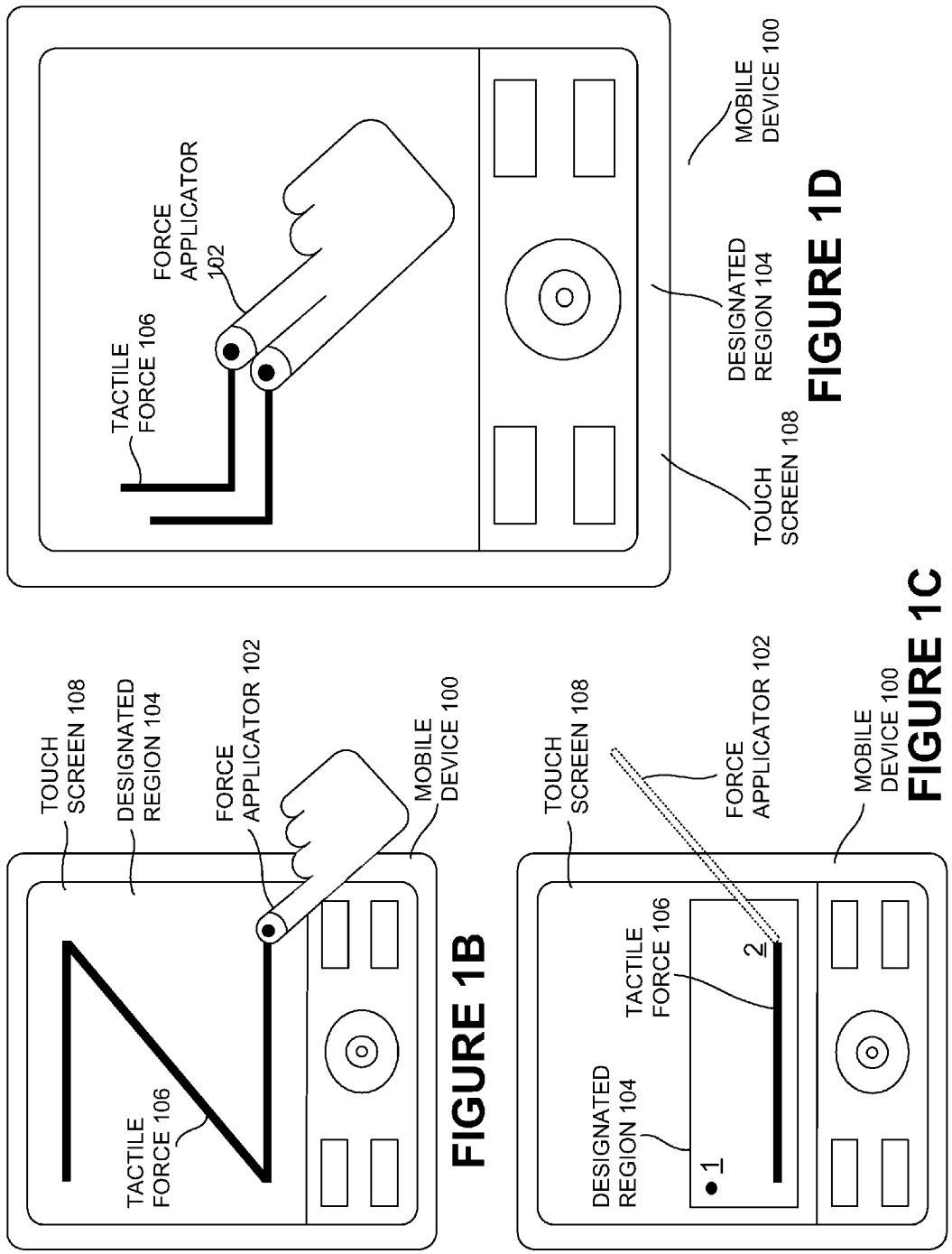

| USER 400 | INITIAL STATE 436 | SECURITY GESTURE 402 | RULES 406 | TOLERANCE 430 | USER PROFILE PERMISSIONS 404 | UNLOCKED STATE 432 | USER PROFILE PERSONALIZED SETTINGS 408 |
|---|---|---|---|---|---|---|---|
| JOHN | BATTERY CONSERVATION MODE 440 | (circle gesture) | FIVE SECONDS TOTAL TIME 418 | (circle) REVERSE OK | ALL ACCESS 410 | TELEPHONIC COMMUNICATION DEVICE 412 | CONTACT LIST 414 GREETING MESSAGE 416 |
| JOHN | BATTERY CONSERVATION MODE 440 | (zig-zag gesture) | DESIGNATED REGION ON TOUCH SCREEN 104 | (zig-zag) OPPOSITE OK | ALL ACCESS 410 | TELEPHONIC COMMUNICATION DEVICE 412 | CONTACT LIST 414 GREETING MESSAGE 416 |
| JANE | BATTERY CONSERVATION MODE 440 | (wavy gesture, TWICE) | SIMULTANEOUS AND SERIAL 424 | (arrow) HIGH | TELEPHONIC COMMUNICATION DEVICE 412 | BROWSER APPLICATION 422 | CONTACT LIST 414 AND GREETING MESSAGE 416 |
| JOSE | CERTAIN FUNCTIONS DISABLED | (parallel arrows) | SIMULTANEOUS AND SERIAL 424 MULTIPLE DISTINCT LOCATIONS 426 | NONE | BROWSER APPLICATION 414 | TELEPHONIC COMMUNICATION DEVICE 412 | MEDIA PLAYLIST 416 CUSTOMIZED BROWSER SETTINGS 420 |
| RAJ | BATTERY CONSERVATION MODE 440 | (circle gesture, TWICE) | HOLD ONE SECOND DURATION AT BOTTOM OF GESTURE 428 | (circle) | ALL ACCESS 410 | MEDIA PLAYER 434 | MEDIA PLAYER 434 |
| RAY | CERTAIN FUNCTION DISABLED | FAILED TO ENTER CORRECT UNLOCKING GESTURE 402 | CORRECT UNLOCKING GESTURE REQUIRED 412 | NONE | EMERGENCY CALLS | EMERGENCY CALLS ONLY STATE 438 | NONE |
| ... | ... | ... | ... | ... | ... | ... | NONE |
| | | | | | | | ... |

FIGURE 4

EXAMPLE RULES FOR DETERMINING MATCH OF ANOTHER TACTILE FORCE AND UNLOCKING GESTURE

| RULE/REFERENCE GESTURE 702 | ACCEPTED GESTURES 704 | REJECTED GESTURES 706 |
|---|---|---|
| UNLOCKING GESTURE MUST BE LOCATED COMPLETELY WITHIN DESIGNATED REGION | | |
| ANOTHER TACTILE FORCE MUST MATCH SHAPE OF UNLOCKING GESTURE, BUT NOT SIZE OR POSITION WITHIN DESIGNATED AREA 104 | | |
| ANOTHER TACTILE FORCE MUST MATCH SHAPE OF UNLOCKING GESTURE, BUT NOT SIZE OR POSITION WITHIN DESIGNATED AREA 104 SIMULTANEOUS | | |
| ANOTHER TACTILE FORCE MUST SATISFY A THRESHOLD PARAMETER | | |
| ANOTHER TACTILE FORCE MUST BE COMPLETED WITHIN ONE SECOND | 0.5 SECONDS | 1.5 SECONDS |
| ANOTHER TACTILE FORCE MUST BE IN THE PROPER SEQUENCE | | |
| ⋮ | ⋮ | ⋮ |

FIGURE 7

TOUCH-BASED AUTHENTICATION OF A MOBILE DEVICE THROUGH USER GENERATED PATTERN CREATION

FIELD OF TECHNOLOGY

This disclosure relates generally to an enterprise method, a technical field of software and/or hardware technology and, in one example embodiment, to touch-based authentication of a mobile device through user generated pattern creation.

BACKGROUND

Security of a mobile device (e.g., a mobile phone, a mobile player, an Apple® iPhone®, etc.) may be of concern to a user. Furthermore, the user may utilize the mobile device in manner similar to a personal computer (e.g., browse the Internet, access email, etc.). Consequently, the mobile device may include confidential information (e.g., a web browser history, an email account, a past call history, a text message, a voice message, etc.). Due to the nature of this type of information, a security breach may be costly to the user or his/her organization (e.g., a difficulty in recreating lost information).

A design of the mobile device may make it problematic to implement an additional security protocol. For example, the mobile device may utilize a touchscreen (e.g., a display which can detect a location of forces in a display area) for user input rather than a physical keypad. The user may be able to access the mobile device utilizing the touchscreen simply by tapping a surface of the touchscreen in an arbitrary manner and/or performing a templated gesture (e.g., a pattern such as movement from left to right) on a surface of the touch screen. As a result, confidential information may be accessed by anyone merely in physical possession of the mobile device.

The touchscreen mobile device may include a virtual keypad (e.g., a form of a template to guide the user, an alpha-numeric virtual key pad, etc.). The user may use the virtual keypad to enter a pass code to access information. This process may be slow and/or cumbersome (e.g., a fingertip of the user may be of comparatively same size as an area of a virtual keypad symbol, the virtual keypad may not have the same tactile feel as the physical keypad, etc.). Use of a virtual keypad may also be inconvenient and/or dangerous when an attention of the user is diverted (e.g., walking, working, eating, etc.). A handicapped user (e.g., a sight-impaired person, a person with out fingers or hands, a person with impaired dexterity, etc.) may have difficulty inputting information with the virtual keypad. Furthermore, the alpha-numeric pass code may be difficult to remember for a primary user and/or secondary users of the mobile device. Thus, security of the mobile device may be breached resulting in theft and/or misappropriation of the confidential information that may be stored in the mobile device.

SUMMARY

A method, system, and/or apparatus of a touch-based authentication of a mobile device through user generated pattern creation are disclosed. In one aspect, a method of a mobile device includes recognizing a tactile force on a touch screen without a visual aid as an unlocking gesture, storing the unlocking gesture to a memory (e.g., may be a local memory of the mobile device that may be internal to the mobile device) of the mobile device, associating another tactile force on the touch screen with the unlocking gesture, and transforming the mobile device from an initial state to an unlocked state based on the association between the another tactile force and the unlocking gesture.

The method may include transforming the mobile device to operate as a telephonic communication device in the unlocked state. The method may also include accessing a contact list and/or a greeting message based on a user profile of the telephonic communication device associated with the unlocking gesture to transform the mobile device to operate as the telephonic communication device. In addition, the method may include accessing a media playlist based on the user profile of the telephonic communication device associated with the unlocking gesture to transform the mobile device to operate as a media player.

The method may include accessing a set of bookmarks based on the user profile of the telephonic communication device associated with the unlocking gesture to enable customized settings on a browser application of the mobile device. The method may also include determining that the tactile force may be placed at multiple distinct locations on the touch screen while recognizing the tactile force as the unlocking gesture. The multiple distinct locations may be simultaneously and/or serially placed.

The method may include designating a region of the touch screen as available to receive the another tactile force, such that the another tactile force may be algorithmically determinable to be the unlocking gesture when recognized in the designated region. The method may also include determining a duration of the another tactile force at a particular location of the touch screen to determine whether it may be the unlocking gesture. In addition, the method may include determining that a total time to create the another tactile force may be within a permitted amount of time when determining whether it is the unlocking gesture.

The method may include operating the mobile device in the initial state such that certain functions may be disabled in the initial state to conserve battery consumption of the mobile device through a power management circuitry of the mobile device. The method may also include determining that a next tactile force is unrelated with the unlocking gesture. In addition, the method may transform the mobile device from the initial state to a locked state based on the determination that the next tactile force that may be unrelated with the unlocking gesture.

The method may include permitting the mobile device to communicate with an emergency service provider even when in the locked state. The method may also include determining that the unlocking gesture may be similar to a stored gesture beyond a tolerance value. The method may request a different gesture to be stored when the determination may be made that the unlocking gesture may be similar beyond the tolerance value. In addition, the method may include determining that the another tactile force may be unique but within an acceptance range of associability with the unlocking gesture when associating the another tactile force with the unlocking gesture.

In another aspect, a method of a mobile device includes determining whether a tactile force on a touch screen without any visual aid on the touch screen is associated with a security gesture (e.g., may be a user-generated gesture that may be stored in a memory that is internal to the mobile device), permitting access to a set of applications of the mobile device when an association is made between the tactile force and the security gesture, and denying access to the set of applications of the mobile device when the association fails to be made between the tactile force and the security gesture.

The method may also include directly opening a particular application of the mobile device when the association may be made between the tactile force and the security gesture.

In yet another aspect, a mobile device includes a touchscreen to recognize a tactile force using a processor of the mobile device, a security module interfaced with the processor to associate the tactile force with a security gesture, and to determine access to a set of features on the mobile device based on the association, and a user module of the security module to create security gestures based on a user input.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 1A, 1B, 1C and 1D is a system view of a mobile device recognizing an application of force in a designated region through a tactile force on a touch screen, according to one embodiment.

FIG. 4 is a table view illustrating various fields such as user, an initial state, security gesture, rules, etc., according to one embodiment.

FIG. 7 is a table view illustrating example rules/reference gestures, accepted, and rejected gestures, according to one embodiment.

Other features of the present embodiments will be apparent from the accompanying drawings and from the detailed description that follows.

DETAILED DESCRIPTION

A method, system, and apparatus of a touch-based authentication of a mobile device through user generated pattern creation are disclosed. Although the present embodiments have been described with reference to specific example embodiments, it will be evident that various modifications and changes may be made to these embodiments without departing from the broader spirit and scope of the various embodiments.

Figure 1A:
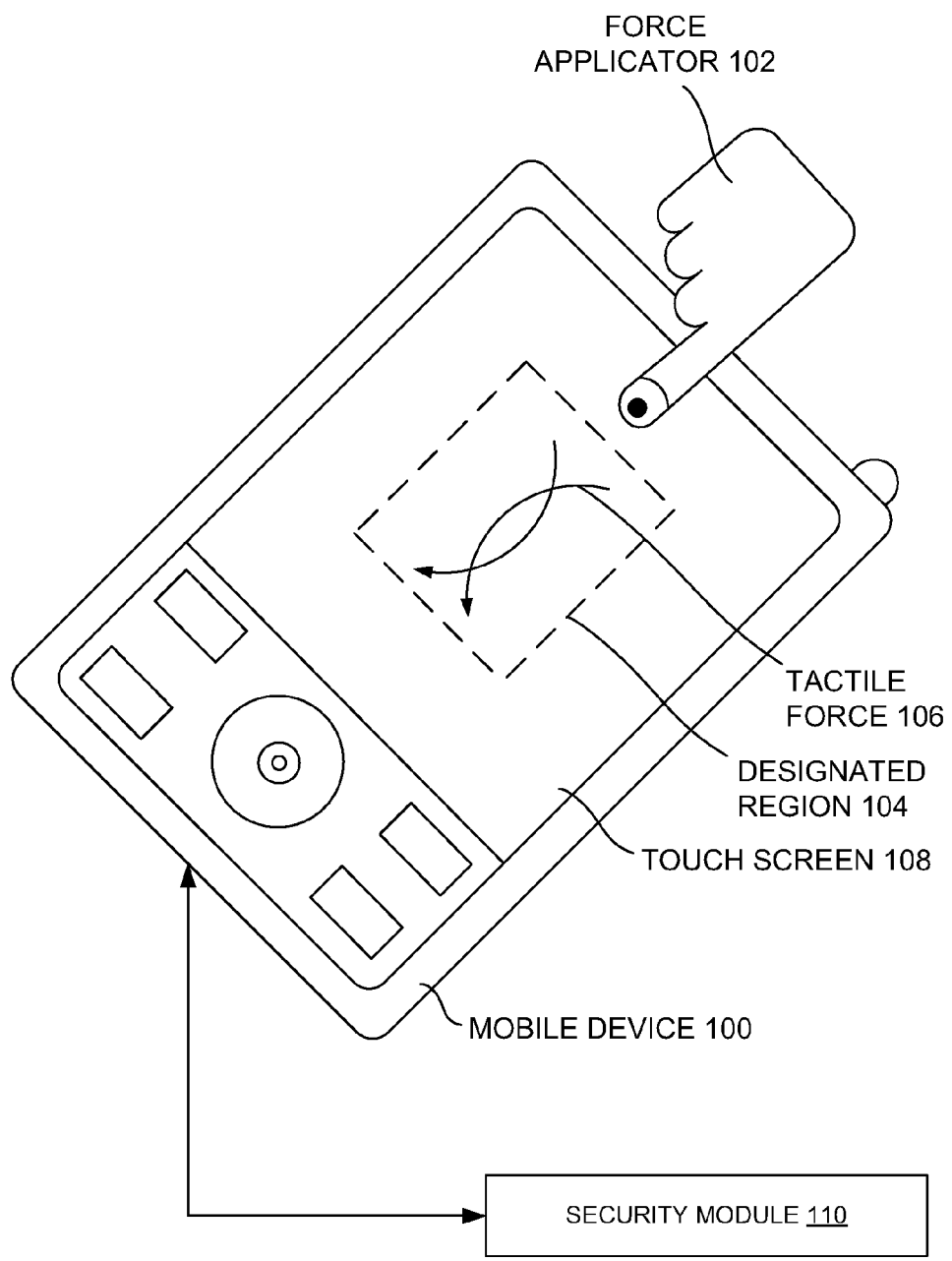

In one embodiment, a method of a mobile device (e.g., the mobile device 100 of FIG. 1) includes recognizing a tactile force (e.g., the tactile force 106 of FIG. 1) on a touch screen (e.g., the touchscreen 108 of FIG. 1) without a visual aid as an unlocking gesture, storing the unlocking gesture to a memory (e.g., may be a local memory of the mobile device that may be internal to the mobile device) of the mobile device 100, associating another tactile force on the touchscreen 108 with the unlocking gesture, and transforming the mobile device 100 from an initial state to an unlocked state based on the association between the another tactile force and the unlocking gesture.

In another embodiment, a method of a mobile device (e.g., the mobile device 100 of FIG. 1) includes determining whether a tactile force (e.g., the tactile force 106 of FIG. 1) on a touch screen (e.g., the touchscreen 108 of FIG. 1) without any visual aid on the touchscreen 108 is associated with a security gesture (e.g., may be a user-generated gesture that may be stored in a memory that is internal to the mobile device), permitting access to a set of applications of the mobile device 100 when an association is made between the tactile force 106 and the security gesture, and denying access to the set of applications of the mobile device 100 when the association fails to be made between the tactile force 106 and the security gesture.

In yet another embodiment, a mobile device (e.g., the mobile device 100 of FIG. 1) includes a touchscreen (e.g., the touchscreen 108 of FIG. 1) to recognize a tactile forced (e.g., the tactile force 106 of FIG. 1) using a processor (e.g., the processor 202 of FIG. 2) of the mobile device 100, a security module (e.g., the security module 110 of FIG. 2) interfaced with the processor 202 to associate the tactile force 106 with a security gesture, and to determine access to a set of features on the mobile device 100 based on the association, and a user module (e.g., the user module 320 of FIG. 3) of the security module 110 to create security gestures based on a user input.

FIGS. 1A, 1B, 1C and 1D is a system view of a mobile device recognizing an application of force in a designated region through a tactile force on a touchscreen, according to one embodiment. Particularly, FIG. 1 illustrates a mobile device 100, a force applicator 102, a designated region 104, a tactile force 106, a touchscreen 108, and a security module 110, according to one embodiment.

The mobile device 100 may be a device used for communication and/or for processing information (e.g., browsing, forums, mail, chat, etc.) through the network (e.g., internet network). The force applicator 102 (e.g., finger, stylus, etc.) may apply contact forces to the fingertip to enable the force used with or without the secondary fingertip force applicator (e.g., may be stylus, etc.). The designated region 104 may be the region on the touch screen which may receive tactile force. The tactile force 106 may be a force applied physically by the user (e.g., by touching, by using a stylus, etc.). The touchscreen 108 may be an input/output interface which may detect a location of touch within the display area. The security module 110 may provide security to the mobile device 100 based on the tactile force 106 (e.g., the security gesture).

In example embodiment, the mobile device 100 may recognize the force applicator 102 (e.g., may be in the form of touch, etc.) in the designated region 104 of the touchscreen 108. The force may be an unlocking gesture/tactile force 106 that may be used for unlocking the mobile device 100.

Figure 2:
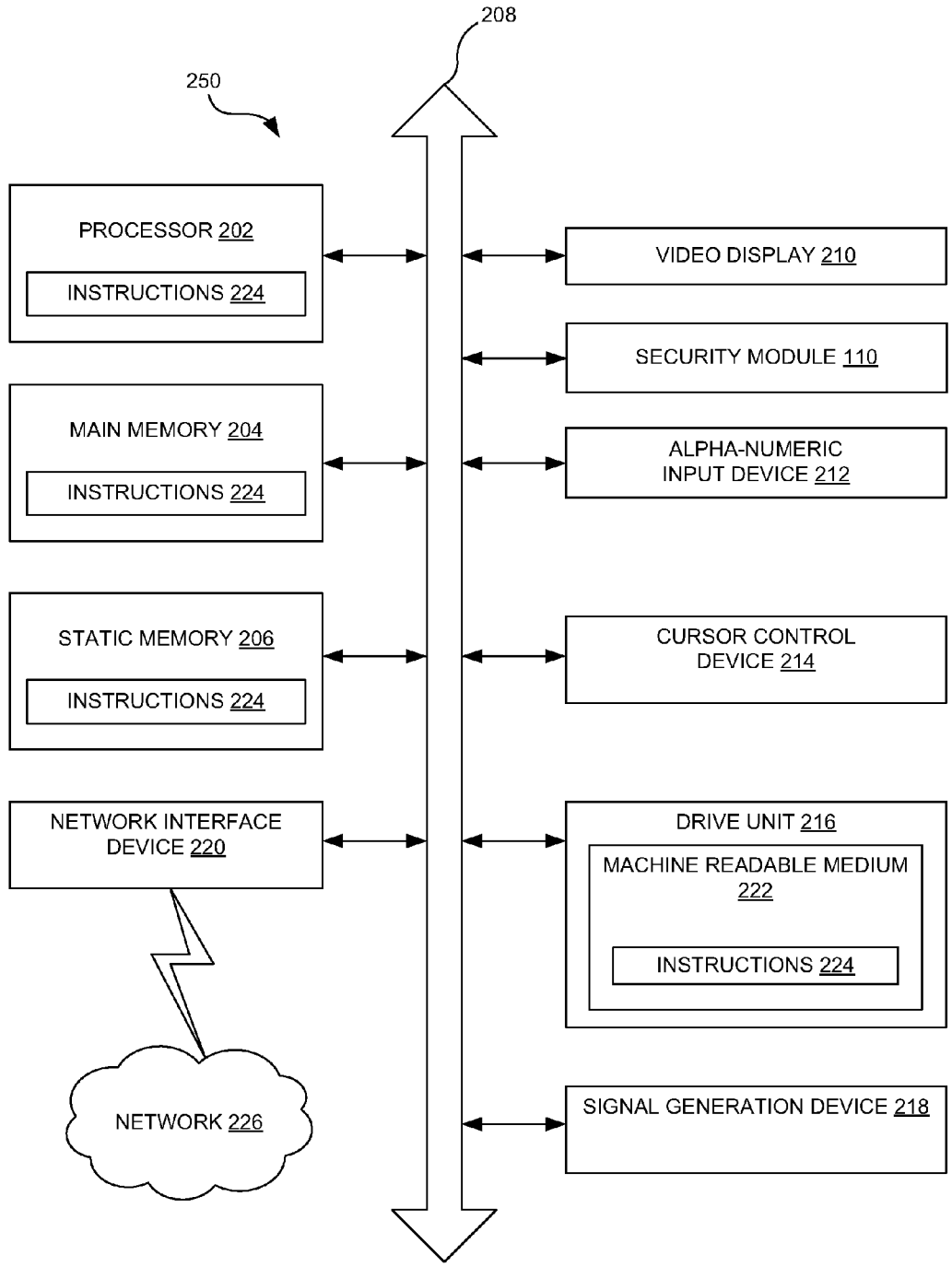
FIG. 2 is a diagrammatic system view of a data processing system in which any of the embodiments disclosed herein may be performed, according to one embodiment.

FIG. 2 is a diagrammatic system view 200 of a data processing system in which any of the embodiments disclosed herein may be performed, according to one embodiment. Particularly, the diagrammatic system view 200 of FIG. 2 illustrates a security module 110, a processor 202, a main memory 204, a static memory 206, a bus 208, a video display 210, an alpha-numeric input device 212, a cursor control device 214, a drive unit 216, a signal generation device 218, a network interface device 220, a machine readable medium 222, instructions 224, and a network 226, according to one embodiment.

The diagrammatic system view 200 may indicate a personal computer and/or the data processing system in which one or more operations disclosed herein are performed. The security module 110 may provide security to the device from unauthorized access (e.g., may be mishandled, misused, stolen, etc.). The processor 202 may be a microprocessor, a state machine, an application specific integrated circuit, a field programmable gate array, etc. (e.g., Intel® Pentium® processor, 620 MHz ARM 1176, etc.). The main memory 204 may be a dynamic random access memory and/or a primary memory of a computer system.

The static memory 206 may be a hard drive, a flash drive, and/or other memory information associated with the data processing system. The bus 208 may be an interconnection between various circuits and/or structures of the data processing system. The video display 210 may provide graphical representation of information on the data processing system. The alpha-numeric input device 212 may be a keypad, a keyboard, a virtual keypad of a touchscreen and/or any other input device of text (e.g., a special device to aid the physically handicapped).

The cursor control device 214 may be a pointing device such as a mouse. The drive unit 216 may be the hard drive, a storage system, and/or other longer term storage subsystem. The signal generation device 218 may be a bios and/or a functional operating system of the data processing system. The network interface device 220 may be a device that performs interface functions such as code conversion, protocol conversion and/or buffering required for communication to and from the network 226. The machine readable medium 222 may provide instructions on which any of the methods disclosed herein may be performed. The instructions 224 may provide source code and/or data code to the processor 202 to enable any one or more operations disclosed herein.

Figure 3:
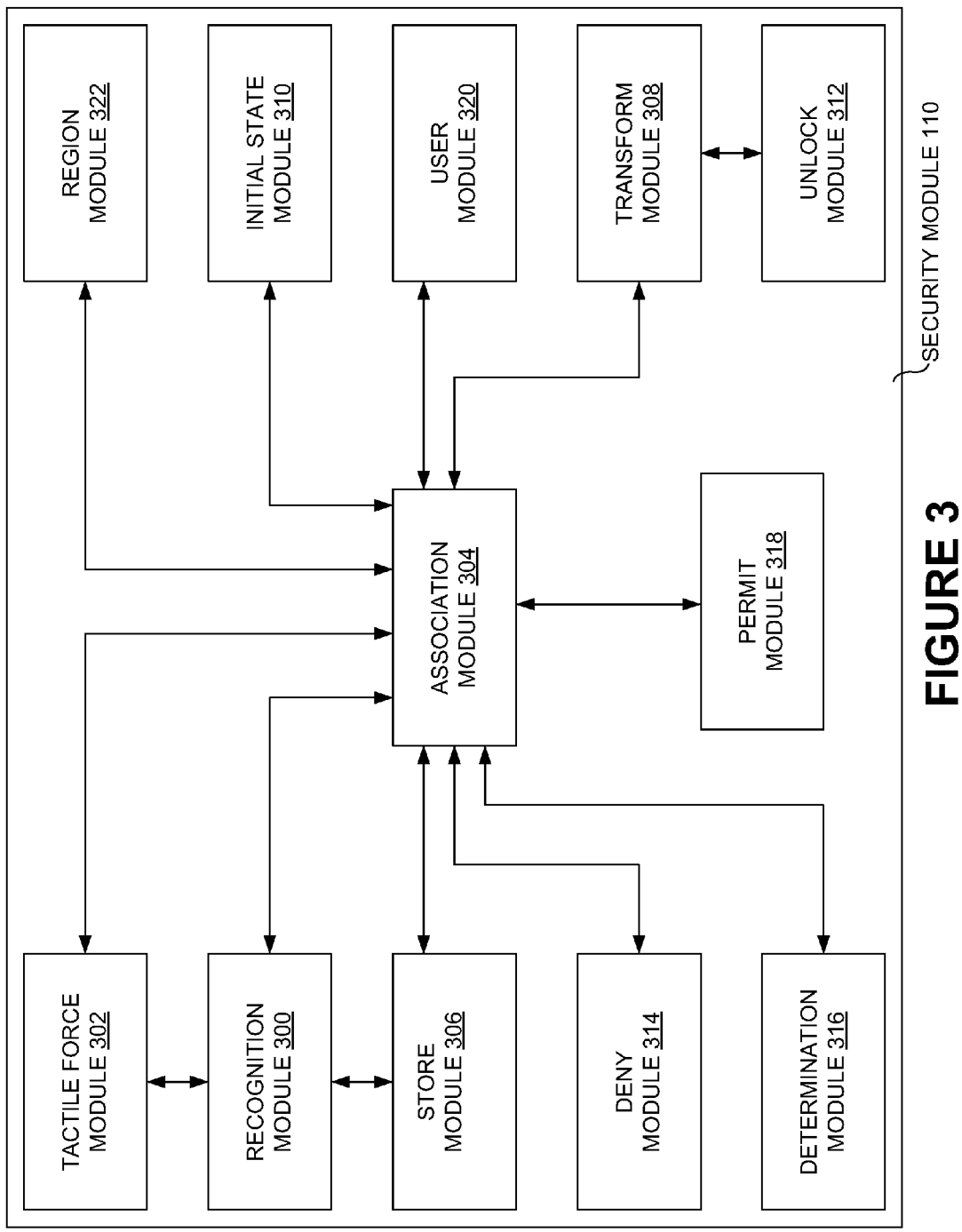
FIG. 3 is an exploded view of a security module, according to one embodiment.

FIG. 3 is an exploded view of a security module 110, according to one embodiment. Particularly, FIG. 3 illustrates a recognition module 300, a tactile force module 302, an association module 304, a store module 306, a transform module 308, an initial state module 310, an unlock module 312, a deny module 314, a determination module 316, a permit module 318, a user module 320, and a region module 322, according to one embodiment.

The recognition module 300 may enable the mobile device 100 to recognize the application of force (e.g., tactile force 106) as the unlocking gesture. The tactile force module 302 may detect tactile force as an unlocking gesture on the touchscreen 108. The association module 304 may associate another tactile force (e.g., may be different kind of force, etc.) on the touchscreen along with the unlocking gesture (e.g., unlocking command, mechanism, etc.). The store module 306 may enable storing the unlocking gesture to the memory of the mobile device 100. The transform module 308 may transform the mobile device 100 to function as the telephonic communication device when unlocked through recognition and validating unlocking gesture. The initial state module 310 may conserve the battery consumption of the mobile device 100 through a power management circuitry of the mobile device 100 (e.g., by putting the mobile device into slow power state, etc.). The unlock module 312 may unlock the mobile device 100 after recognizing and validating the unlocking gesture.

The deny module 314 may deny access to the set of applications of the mobile device 100 when the association module 304 fails to associate between the tactile force 106 and the security gesture. The determination module 316 may determine the accuracy of the association and may determine the total time to create the another tactile force within the permitted amount of time. The permit module 318 may permit the mobile device 100 to communicate with the emergency service provider in the locked state. The user module 320 may create security gestures based on the user input. The region module 322 may recognize the region of the touchscreen 108 on which the application of the force (e.g., may be the tactile force) has taken place.

In example embodiment, the recognition module 300 may communicate with the association module 304 to recognize the tactile force 106 (e.g., using the tactile force module 302) matching with the security gesture. The association module 304 may communicate with the store module 306, the transform module 308, the deny module 314, the determination module 316, the permit module 318, the user module 320, and the region module 322. The unlock module 312 may communicate with the transform module 308 for changing the state (e.g., locked to unlocked, unlocked to locked, etc.) of the mobile device 100.

In one embodiment, the touchscreen 108 may recognize the tactile force 106 (e.g., using the recognition module 300 of FIG. 3) using the processor 202 of the mobile device 100. The security module 110 interfaced with the processor 202 to associate the tactile force 106 with a security gesture, and may determine access to a set of features on the mobile device 100 based on the association. The user module 320 of the security module 110 may create security gestures based on a user input (e.g., using the user module 320 of FIG. 3). The mobile device 100 may be transformed to operate as a telephonic communication device in the unlocked state.

The contact list and/or a greeting message based on the user profile of the telephonic communication device (e.g., using the user module 320 of FIG. 3) associated with the unlocking gesture may be accessed to transform the mobile device 100 (e.g., using the transform module 308 of FIG. 3) to operate as the telephonic communication device. The media playlist based on the user profile (e.g., using the user module 320 of FIG. 3) of the telephonic communication device associated with the unlocking gesture (e.g., using the unlock module 312 of FIG. 3) may be generated to transform the mobile device 100 to operate as a media player. The region of the touchscreen 108 as available (e.g., using the region module 322 of FIG. 3) may be designated to receive the another tactile force, such that the another tactile force may be algorithmically determinable to be the unlocking gesture when recognized in the designated region (e.g., using the recognition module 300 of FIG. 3).

The duration of the another tactile force may be determined (e.g., using the determination module 316 of FIG. 3) at a particular location of the touchscreen 108 to determine whether it may be the unlocking gesture. The total time may be determined (e.g., using the determination module 316 of FIG. 3) to create the another tactile force may be within a permitted amount of time when determining whether it may be the unlocking gesture. The mobile device 100 in the initial state may be operated such that certain functions may be disabled in the initial state (e.g., using the initial state module 310 of FIG. 3) to conserve battery consumption of the mobile device 100 through a power management circuitry of the mobile device 100.

The memory may be a local memory of the mobile device 100 that may be internal to the mobile device 100. It may be determined that the next tactile force may be unrelated with the unlocking gesture. The mobile device 100 may be transformed (e.g., using the transform module 308 of FIG. 3) from the initial state to a locked state based on the determination that the next tactile force may be unrelated with the unlocking gesture (e.g., using the unlock module 312 of FIG. 3). The mobile device 100 may be permitted (e.g., using the permit module 318 of FIG. 3) to communicate with an emergency service provider even when in the locked state.

It may be determined (e.g., using the determination module 316 of FIG. 3) that the unlocking gesture may be similar to a stored gesture beyond a tolerance value. The different gesture may be requested to be stored (e.g., using the store module 306 of FIG. 3) when the determination may be made that the unlocking gesture may be similar beyond the tolerance value. It may be determined (e.g., using the determination module 316 of FIG. 3) that the another tactile force may be unique but within an acceptance range of associability with the unlocking gesture when associating the another tactile force with the unlocking gesture. The security gesture may be the user-generated gesture that may be stored (e.g., using the store module 306 of FIG. 3) in a memory that may be internal to the mobile device 100.

FIG. 4 is a table view illustrating various fields such as user, security gesture, user profile permissions, rules, etc., according to one embodiment. Particularly, FIG. 4 illustrates a user field 400, a security gesture field 402, an user profile permissions field 404, a rules filed 406, an user profile personalized settings field 408, all access 410, telephonic communication device 412, browser application 414, media playlist 416, five seconds total time 418, customized browser settings 420, bookmarks 422, simultaneous and serial 424, multiple distinct 426, hold at bottom of gesture one second duration 428, tolerance field 430, unlocked state field 432, media player 434, initial state 436, emergency calls only state 438, and battery conservation mode 440, according with one embodiment.

The user field 400 may illustrate the user (e.g., John, Jane, Jose, etc. as illustrated in FIG. 4) who may have security gestures to unlock the mobile device 100. The security gesture field 402 may illustrate various unlocking gesture associated to the particular users. The user profile permissions field 404 may display various types of the access in the mobile device 100 to the user. The rules field 406 may be a rules set by the user for unlocking procedure. The user profile personalized settings field 408 may illustrate various personalized settings associated with the user in the mobile device 100. The all access 410 may be a permission to access all the applications (e.g., telephone book, message, email, etc.) in the mobile device 100.

The telephonic communication device 412 may be a permission of the user to use the mobile device 100 to use as a telephonic device. The browser application 414 may be a permission to access created by the user to use the mobile device 100 for browsing. The media playlist 416 may be a personalized setting of the user for playlist. The five seconds total time 418 may be a rule created by the user for locking the mobile device 100 when idle. The customized browser settings 420 may be personalized setting for the browser in the mobile device 100. The bookmarks 422 may be a setting of the user in the mobile device 100 to manage bookmarks.

The simultaneous and serial 424 may be a rule that may be created by the user for input of tactile gestures simultaneously and/or serially in order to unlock the mobile device 100. The multiple distinct 426 may be may be a rule that may enable the user to see distinct multiple communication data (e.g., missed calls, messages, received calls, etc.) simultaneously. The hold at bottom of gesture one second duration 428 may be a rule created by the user for unlocking the mobile device 100. The tolerance field 430 may illustrate capability of the mobile device 100 to recognize slight variations in the security gesture.

The unlocked state field 432 may be a state in the mobile device 100 that may enable the user to use applications that may be customized by the user itself. The media player 434 may be an application that may enable the user to play the media data (e.g., video, audio, etc.) in the mobile device 100. The initial state 436 may be the state that the mobile device would be before unlocking (e.g., power saving mode, etc.). The emergency calls only state 438 may be a state in which the mobile device 100 can only make emergency calls. The battery conservation mode 440 may be the state in which the mobile device 100 may not be used by the user and power consumption in the mobile device 100 may be reduced by internal logic (e.g., by shutting down light, display, etc.).

In example embodiment, FIG. 4 illustrates users and their settings (e.g., may be personalized settings, rules, etc.) in the in the mobile devices 100. The user field 400 may illustrate John, John, Jane, Jose, Raj, and Ray. The security gesture field 402 may illustrate various gestures (e.g., 106, 104 as illustrated in FIG. 4) associated with the particular users. The user profile permissions field 404 may illustrate permissions assigned like, all access 410 associated to the user John, John, telephonic communication device 412 associated to the user Jane, browser application 414 associated to the user Jose, emergency calls associated with the user Ray.

The rules field 406 may illustrate five seconds total time 418 associated to the user John, designated region on touch-screen 108 rule associated to the user John, simultaneous and serial 424 rules associated to the user Jane and Jose, multiple distinct 426 rules associated to the user Jose, the hold at bottom of gesture one second duration 428 rules associated to the user Raj, correct unlocking gesture associated with the user Ray. The user profile personalized settings field 408 may illustrate the contact list 414, and greeting message 416 associated to the user John, contact list 414 and greeting message associated to the user Jane, media playlist 416, bookmarks, customized browser settings 420 associated to the user Jose, no setting associated to the user Raj, bookmarks associated to the user John, no setting associated to the user Ray.

The tolerance field 430 may illustrate possible variations and tolerance associated with security gesture field 402. The unlocked state field 432 may illustrate running applications like, telephonic communication device 412 associated to the user John and Jane, media player 434 application associated to the user Jose and Raj, browser application 414 associated to the user John. Emergency calls only 438 application associated to the user Ray. The initial state 436 may illustrate the battery conservation mode 440 associated with the user John, Jane, and Raj, certain functions disabled associated with the users Jose, John and Ray, according to one embodiment.

Figure 5:
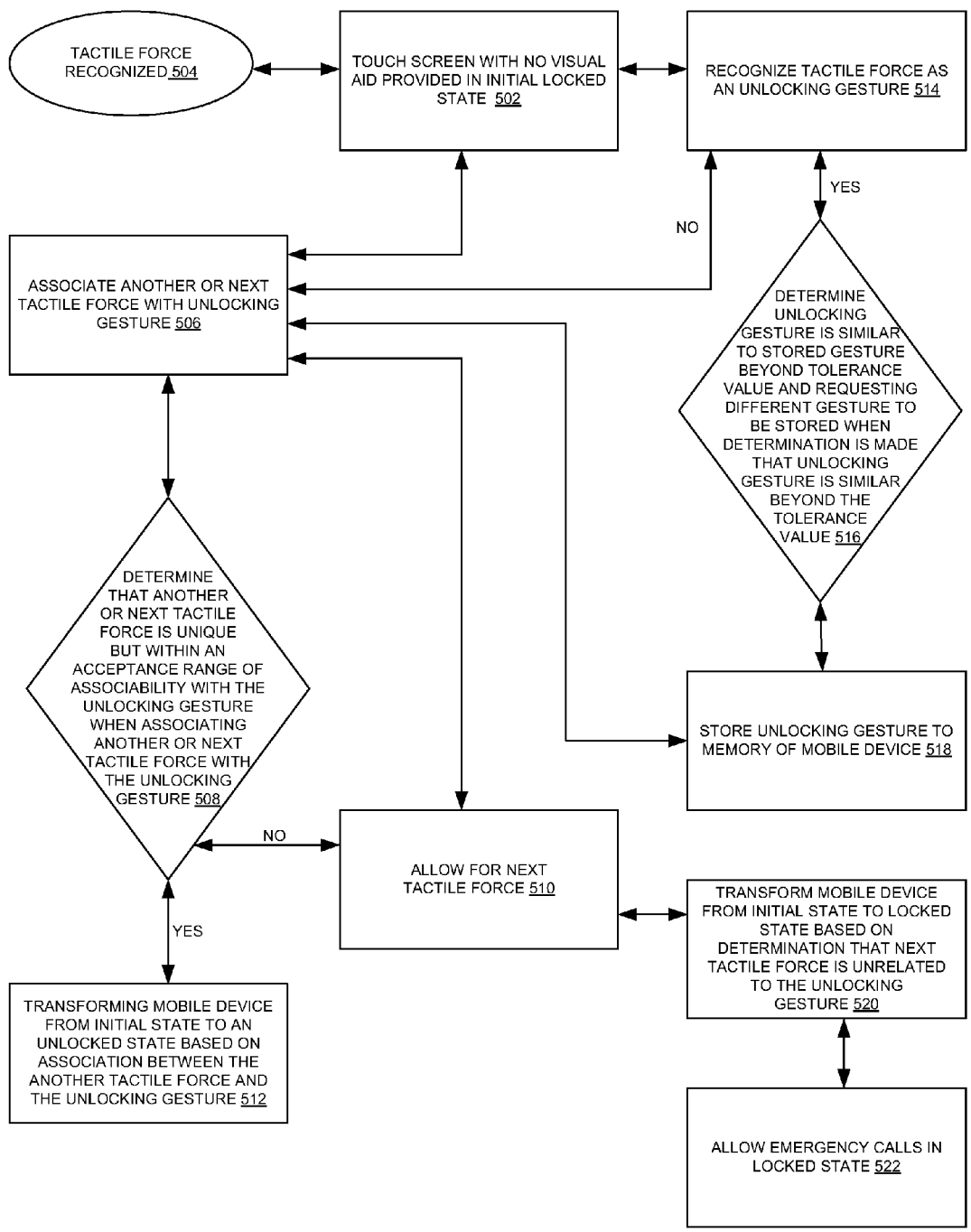
FIG. 5 is a flow chart of a process of a cell phone touch screen unlocking using a tactile force/gesture, according to one embodiment.

FIG. 5 is a flow chart of a process of a cell phone touch screen unlocking using a tactile force/gesture, according to one embodiment. In operation 502, the touchscreen 108 with no visual aid may be provided. In operation 504, the tactile force 106 may be recognized. In operation 506, another or next tactile force may be associated (e.g., using the association module 304 of FIG. 3) with unlocking gesture. In operation 508, a condition may be determined (e.g., using the determination module 316 of FIG. 3) that another or next tactile force may be unique but within an acceptance range of associability with the unlocking gesture when associating the another or next tactile force with the unlocking gesture. If operation 508 outcome is true then operation 512 may be performed, else operation 510 may be performed.

In operation 510, the next tactile force may be allowed. In operation 512, the mobile device 100 from initial state to an unlocked state based on the association between the another tactile force and the unlocking gesture may be transformed (e.g., using the transform module 308 of FIG. 3). In operation 514, the tactile force may be recognized as an unlocking gesture. In operation 516, a condition may be determined (e.g., using the determination module 316 of FIG. 3) that the unlocking gesture may be similar to the stored gesture beyond tolerable value and/or requesting different gesture to be stored when determination may be made that the unlocking gesture may be similarly beyond the tolerance value.

If operation 516 outcome is true then operation 514 may be performed, else operation 518 may be performed. In operation 518, the unlocking gesture may be stored (e.g., using the store module 306 of FIG. 3) to the memory of the mobile device 100. In operation 520, the mobile device 100 may be transformed (e.g., using the transform module 308 of FIG. 3) from the initial state to locked state based on determination that the next tactile force may be unrelated with the unlocking gesture. In operation 522, the emergency calls may be allowed in the locked state.

In one embodiment, the tactile force 106 may be recognized on the touch screen (e.g., the touchscreen 108 of FIG. 1) without a visual aid as an unlocking gesture. The unlocking gesture may be stored (e.g., using the store module 306 of FIG. 3) to a memory of the mobile device 100. Another tactile force on the touchscreen 108 (e.g., using the association module 304 of FIG. 3) may be associated with the unlocking gesture. The mobile device 100 may be transformed (e.g., using the transform module 308 of FIG. 3) from an initial state to an unlocked state based on the association between the another tactile force and the unlocking gesture.

The set of bookmarks may be generated based on the user profile of the telephonic communication device associated with the unlocking gesture (e.g., using the unlock module 312 of FIG. 3) to enable customized settings on a browser application of the mobile device 100. The tactile force 106 may be placed at multiple distinct locations on the touchscreen 108 and may be determined (e.g., using the determination module 316 of FIG. 3) while recognizing the tactile force 106 as the unlocking gesture.

Figure 6:
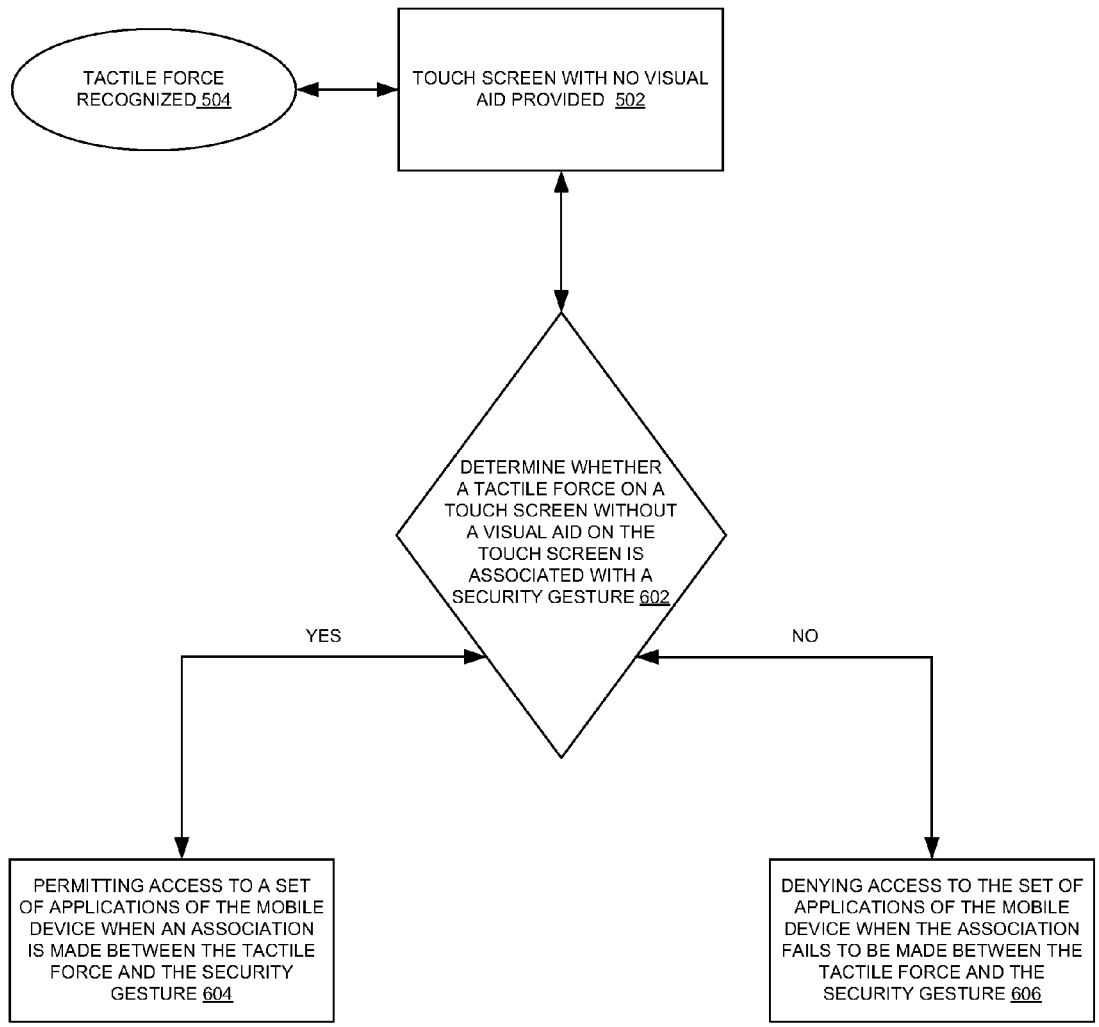
FIG. 6 is a flow chart of a process of a cell phone touch screen unlocking, according to one embodiment.

FIG. 6 is a flow chart of a process of a cell phone touch screen unlocking, according to one embodiment. In operation 502, the touchscreen 108 may be provided with no visual aid. In operation 504, the tactile gesture may be recognized. In operation 602, a condition may be determined whether the tactile force 106 on the touchscreen 108 without a visual aid on the touchscreen 108 may be associated with a security gesture. If the outcome of operation 602 is true then operation 604 may be performed, else operation 606 may be performed. In operation 604, access to a set of applications of the mobile device 100 may be permitted when an association may be made between the tactile force 106 and the security gesture. In operation 606, access to the set of applications of the mobile device 100 may be defined when the association fails to be made between the tactile force 106 and the security gesture.

In one embodiment, the tactile force 106 may be determined (e.g., using the determination module 316 of FIG. 3) on the touchscreen 108 without any visual aid on the touchscreen 108 may be associated with a security gesture. The access may be permitted (e.g., using the permit module 318 of FIG. 3) to a set of applications of the mobile device 100 when an association may be made between the tactile force 106 and the security gesture. The access may be denied (e.g., using the deny module 314 of FIG. 3) to the set of applications of the mobile device 100 when the association fails to be made between the tactile force 106 and the security gesture.

FIG. 7 is a table view illustrating example rules/reference gestures, accepted gestures, and rejected gestures, according to one embodiment. Particularly, FIG. 7 illustrates a rule/reference gesture 702, accepted gestures 704, and rejected gestures 706, according to one embodiment.

The rule/reference gesture 702 may be various rules/references that may enable the user to unlock the mobile device 100 through use of tactile force/security gestures. The accepted gestures 704 may be the gestures that may be accepted after determining the match between another tactile force and unlocking gesture may be under matching conditions (e.g., may be approximately). The rejected gestures 706 may be the gestures that may be rejected after determining the match between another tactile force and the unlocking gesture may not be within the matching conditions.

In example embodiment of FIG. 7 the rule/reference gesture 702 column may illustrate that the "unlocking gesture must be located completely within the designated region" in first row, "another tactile force must match shape of unlocking gesture, but not size or position within designated area 104" in second row, "another tactile force must match shape but not size of unlocking gesture, but not size or position within designated area 104" in third row, "another tactile must satisfy a threshold parameter (e.g., may be curves, bends, etc. as illustrated in FIG. 7) in fourth row, "another tactile force must be completed within one second" in fifth row, and "another tactile force must be in the proper sequence" in the sixth row. The accepted gestures 704 column may illustrate possible gestures (e.g., may be approximately similar, or similar itself) that may be accepted which are associated to the rule/reference gesture 702. The rejected gestures 706 may be the gestures (e.g., may vary drastically compared to rule/reference gesture) that may be rejected with reference to the rule/reference gesture 702.

Figure 8A:
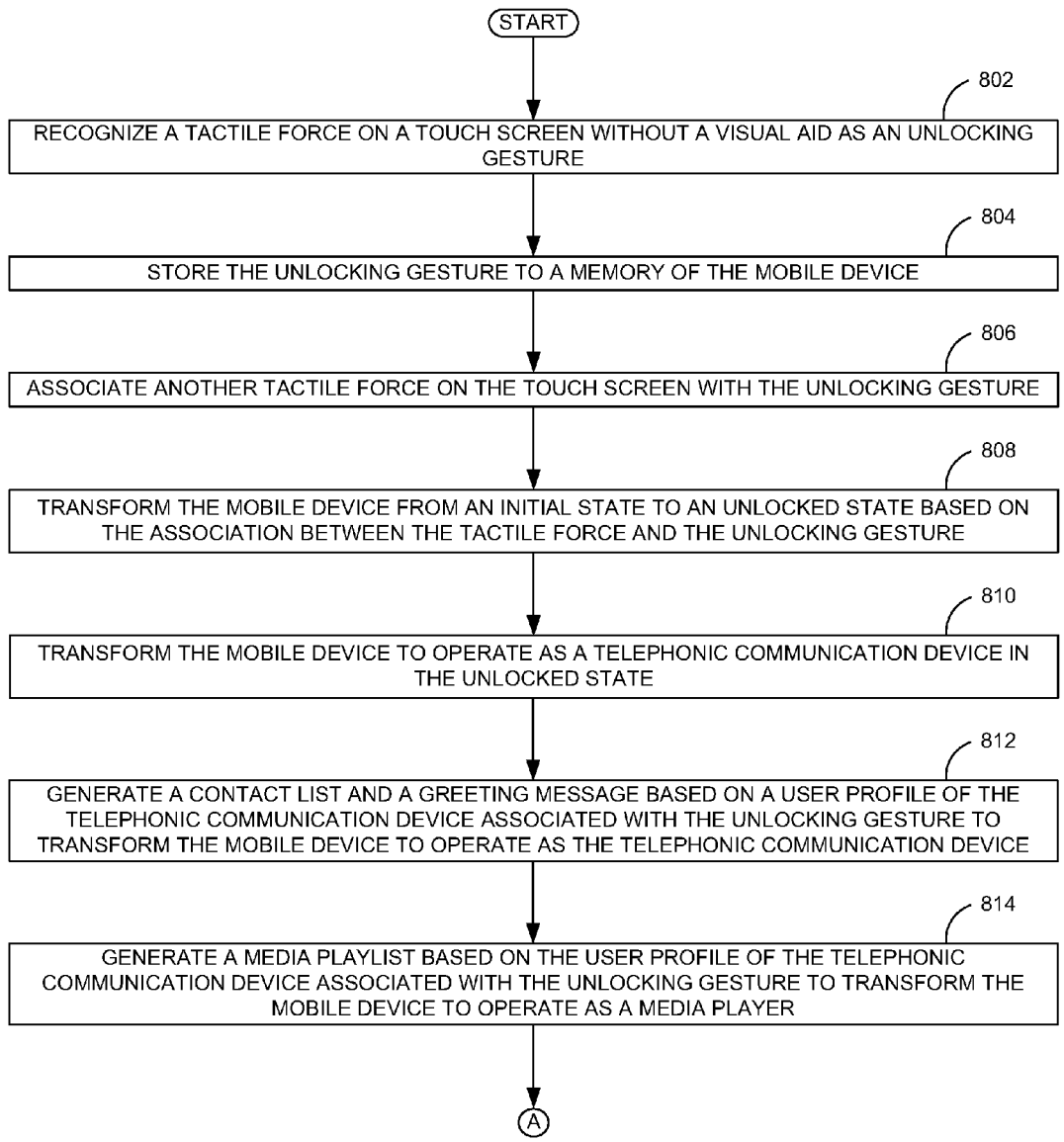
FIG. 8A is a process of recognizing a tactile force on a touch screen without a visual aid as an unlocking gesture, according to one embodiment.

FIG. 8A is a process of recognizing a tactile force (e.g., the tactile force 106 of FIG. 1) on the touchscreen 108 without a visual aid as an unlocking gesture, according to one embodiment. In operation 802, the tactile force 106 may be recognized (e.g., using the recognition module 300 of FIG. 3) on a touch screen (e.g., the touchscreen 108 of FIG. 1) without a visual aid as an unlocking gesture. In operation 804, the unlocking gesture may be stored (e.g., using the store module 306 of FIG. 3) to a memory (e.g., memory card, etc.) of the mobile device 100.

In operation 806, another tactile force on the touchscreen 108 may be associated (e.g., using the association module 304 of FIG. 3) with the unlocking gesture. In operation 808, the mobile device 100 may be transformed (e.g., using the transform module 308 of FIG. 3) from an initial state to an unlocked state based on the association between the another tactile force and the unlocking gesture. In operation 810, the mobile device 100 may be transformed (e.g., using the transform module 308 of FIG. 3) to operate as a telephonic communication device in the unlocked state (e.g., using the unlock module 312 of FIG. 3). In operation 812, a contact list and a greeting message based on a user profile of the telephonic communication device associated (e.g., using the association module 304 of FIG. 3) with the unlocking gesture may be generated (e.g., may be because of user settings, etc.) to transform the mobile device 100 (e.g., using the transform module 308 of FIG. 3) to operate as the telephonic communication device.

In operation 814, a media playlist based on the user profile of the telephonic communication device (e.g., using the user module 320 of FIG. 3) associated with the unlocking gesture may be generated (e.g., may be using the user settings, etc.) to transform the mobile device 100 to operate as a media player.

Figure 8B:
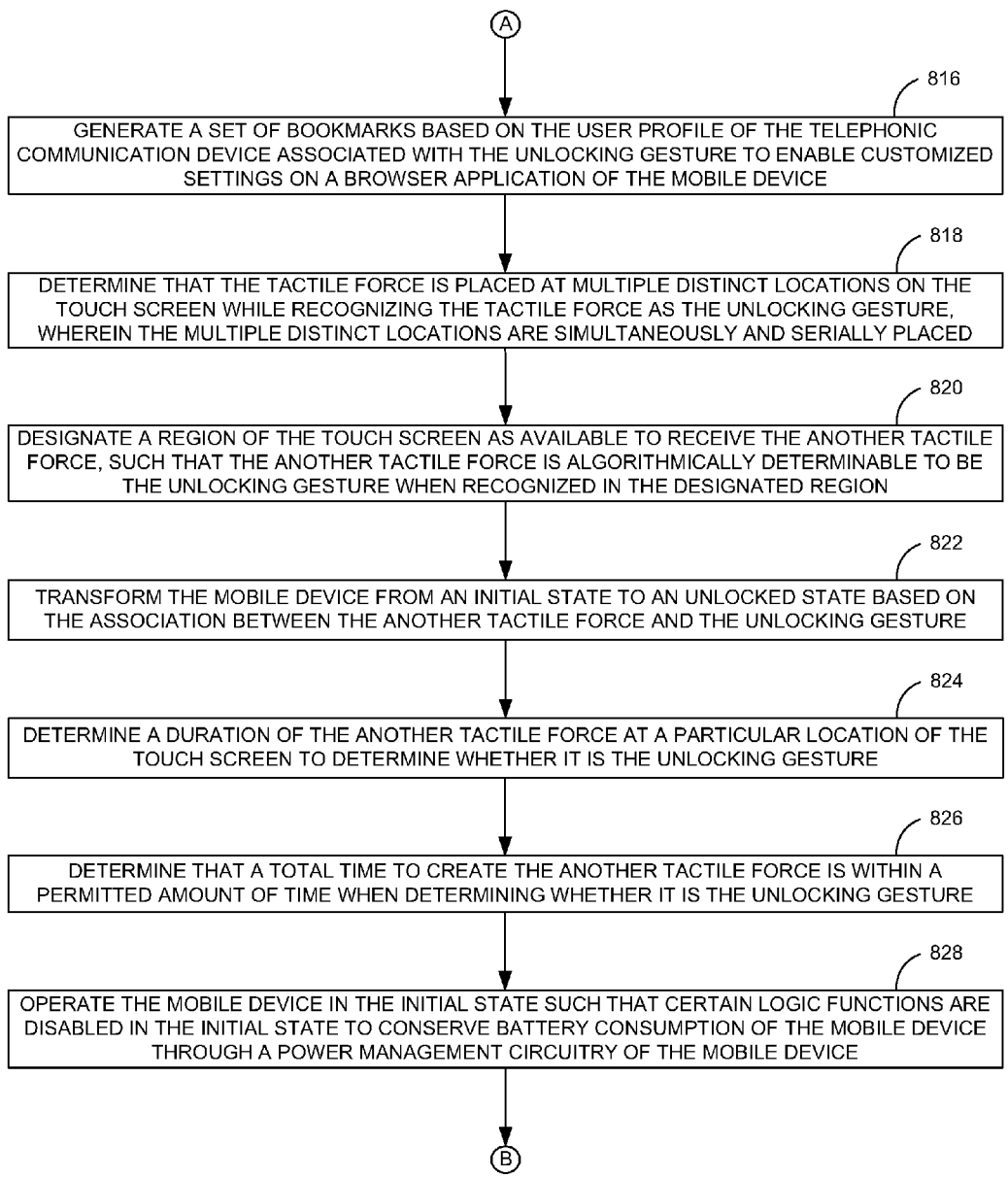
FIG. 8B is a continuation of process flow of FIG. 7A, illustrating additional operations, according to one embodiment.

FIG. 8B is a continuation of process flow of FIG. 8A, illustrating additional operations, according to one embodiment. In operation 816, a set of bookmarks based on the user profile of the telephonic communication device associated (e.g., using the association module 304 of FIG. 3) with the unlocking gesture may be generated (e.g., using the unlock module 312 of FIG. 3) to enable customized settings on a browser application of the mobile device 100. In operation 818, the tactile force 106 may be placed at multiple distinct locations on the touchscreen 108 and may be determined (e.g., using the transform module 308 of FIG. 3) while recognizing the tactile force 106 (e.g., using the recognition module 300 of FIG. 3) as the unlocking gesture.

In operation 820, a region of the touchscreen 108 as available (e.g., using the region module 322 of FIG. 3) may be designated to receive the another tactile force, such that the another tactile force may be algorithmically determinable to be the unlocking gesture when recognized (e.g., using the recognition module 300 of FIG. 3) in the designated region 104. In operation 822, a duration (e.g., five seconds, one second as assigned in rules, etc.) of the another tactile force may be determined (e.g., using the determination module 316 of FIG. 3) at a particular location of the touchscreen 108 to determine whether it may be the unlocking gesture. In operation 824, a total time may be determined (e.g., using the determination module 316 of FIG. 3) to create the another tactile force and may be within a permitted amount of time when determining whether it may be the unlocking gesture.

In operation 826, the mobile device 100 in the initial state may be operated such that certain functions may be disabled in the initial state to conserve battery consumption of the mobile device 100 (e.g. using the initial state module 310 of FIG. 3) through a power management circuitry of the mobile device 100. The memory may be a local memory of the mobile device 100 that may be internal to the mobile device 100. In operation 828, it may be determined (e.g., using the determination module 316 of FIG. 3) that a next tactile force may be unrelated with the unlocking gesture.

Figure 8C:
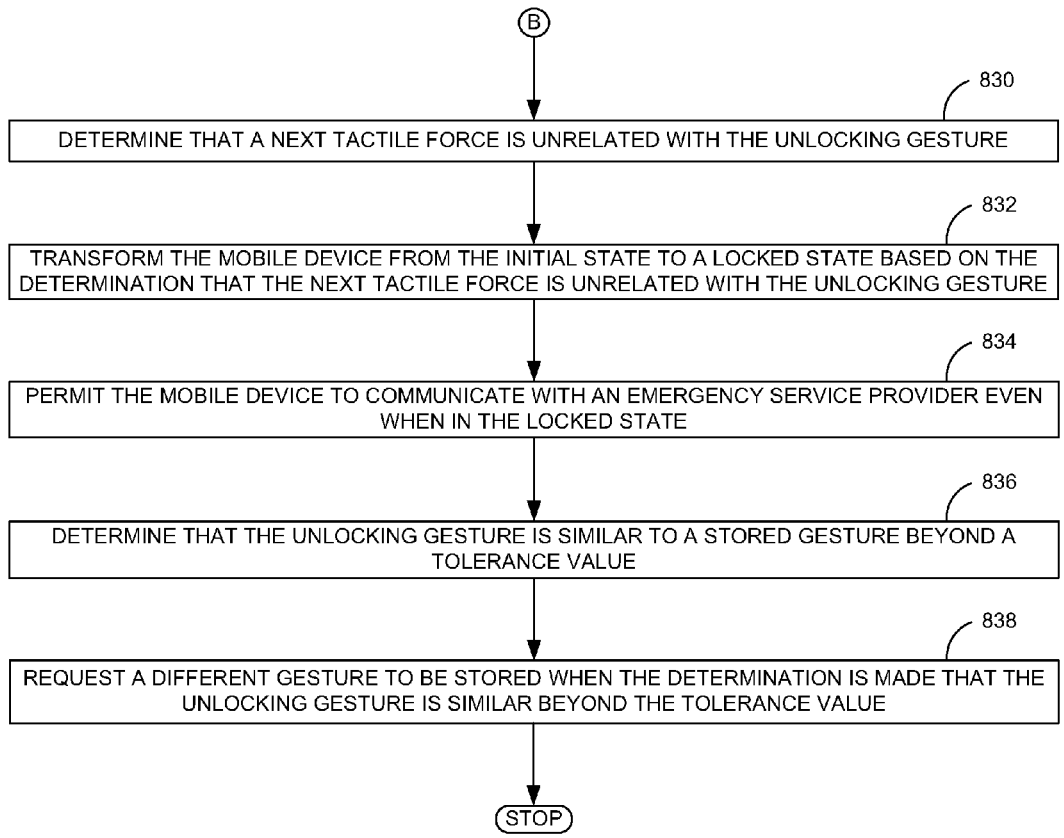
FIG. 8C is a continuation of process flow of FIG. 7B, illustrating additional operations, according to one embodiment.

FIG. 8C is a continuation of process flow of FIG. 8B, illustrating additional operations, according to one embodiment. In operation 830, the mobile device 100 may be transformed from the initial state to a locked state (e.g., using the transform module 308 of FIG. 3) based on the determination that the next tactile force may be unrelated with the unlocking gesture. In operation 832, the mobile device 100 may be permitted to communicate with an emergency service provider (e.g., using the permit module 318 of FIG. 3) even when in the locked state. In operation 834, it may be determined (e.g., using the determination module 316 of FIG. 3) that the unlocking gesture may be similar to a stored gesture beyond a tolerance value.

In operation 836, a different gesture may be requested to be stored (e.g., using the store module 306 of FIG. 3) when the determination may be made that the unlocking gesture may be similar beyond the tolerance value. In operation 838, it may be determined (e.g., using the determination module 316 of FIG. 3) that the another tactile force may be unique but within an acceptance range of associability with the unlocking gesture when associating the another tactile force with the unlocking gesture (e.g., using the unlock module 312 of FIG. 3).

Figure 9:
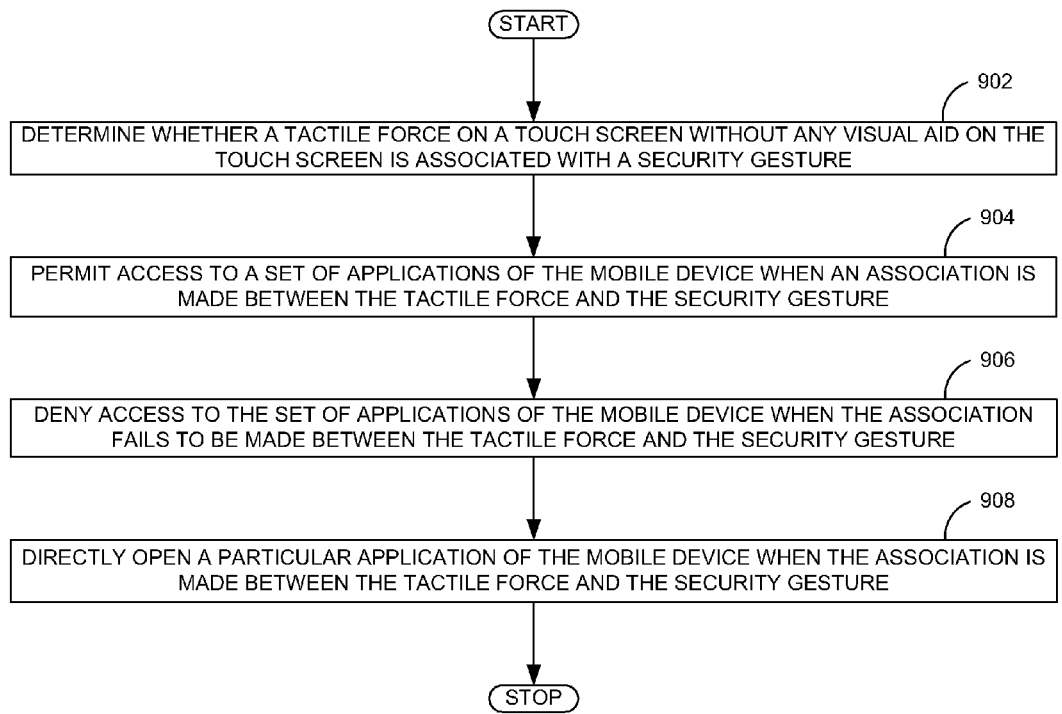
FIG. 9 is a process flow of an opening a particular application of the mobile device when the association is made between the tactile force and the security gesture, according to one embodiment.

FIG. 9 is a process flow of an opening a particular application of the mobile device 100 when the association is made between the tactile force 106 and the security gesture, according to one embodiment. In operation 902, a tactile force (e.g., the tactile force 106 of FIG. 1) may be determined (e.g., using the determination module 316 of FIG. 3) on a touch screen (e.g., the touchscreen 108 of FIG. 1) without any visual aid on the touchscreen 108 and may be associated with a security gesture. In operation 904, access may be permitted (e.g., using the permit module 318 of FIG. 3) to a set of applications of the mobile device 100 when an association may be made between the tactile force 106 and the security gesture. In operation 906, access may be denied (e.g., using the deny module 314 of FIG. 3) to the set of applications of the mobile device 100 when the association fails to be made between the tactile force 106 and the security gesture. In operation 908, a particular application of the mobile device 100 may be directly opened when the association is made between the tactile force 106 and the security gesture.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the security module 110, the recognition module 300, the tactile force module 302, the association module 304, the store module 306, the transform module 308, the initial state module 310, the unlock module 312, the deny module 314, the determination module 316, the permit module 318, the user module 320, and the region module 322, and other modules of FIGS. 1-9 may be enabled using software and/or using transistors, logic gates, and electrical circuits (e.g., application specific integrated ASIC circuitry) such as a security circuit, a recognition circuit, a tactile force circuit, an association circuit, a store circuit, a transform circuit, an initial state circuit, an unlock circuit, a deny circuit, a determination circuit, a permit circuit, an user circuit, a region circuit, and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:
1. A method of a mobile device comprising:
defining a tactile force on a touch screen of a mobile device without a visual aid;
wherein the tactile force may consist of an application within a designated input region of the touch screen of an arbitrarily complex spatial and temporal pattern of tactile forces;

recognizing an another tactile force on the touch screen without a visual aid as an unlocking gesture;
wherein a variable location on the touch screen of the mobile device is designated as available to receive the another tactile force;
wherein the another tactile force is algorithmically determinable to be the unlocking gesture when recognized on the touch screen of the mobile device;
wherein a total time to create the another tactile force is within a permitted amount of time when determining whether it is the unlocking gesture;
storing the unlocking gesture to a memory of the mobile device;
determining that the another tactile force is placed at multiple distinct locations on the touch screen without a visual aid while recognizing the another tactile force as the unlocking gesture, wherein the multiple distinct locations are simultaneously and serially placed;
associating the another tactile force on the touch screen without a visual aid with the unlocking gesture;
wherein the another tactile force applied on the designated area of the touch screen receptive to the tactile force is in a variable location within the designated area of the touch screen receptive to the tactile force;
wherein the another tactile force is applied without a visual aid on the designated area which comprises the touch screen that is receptive to the tactile force enclosed within a touch insensitive enclosure of the mobile device;
wherein the another tactile force is within an acceptable range of associability with the unlocking gesture when associating the another tactile force with the unlocking gesture; and
transforming the mobile device from an initial state to an unlocked state based on the association between the another tactile force and the unlocking gesture.

2. The method of claim 1 further comprising:
transforming the mobile device to operate as a telephonic communication device in the unlocked state.

3. The method of claim 2 further comprising:
accessing a contact list and a greeting message based on a user profile of the telephonic communication device associated with the unlocking gesture to transform the mobile device to operate as the telephonic communication device.

4. The method of claim 3 further comprising accessing a media playlist based on the user profile of the telephonic communication device associated with the unlocking gesture to transform the mobile device to operate as a media player.

5. The method of claim 4 further comprising associating a set of bookmarks based on the user profile of the telephonic communication device associated with the unlocking gesture to enable customized settings on a browser application of the mobile device.

6. The method of claim 1 further comprising determining that the tactile force is placed at multiple distinct locations on the touch screen while recognizing the tactile force as the unlocking gesture, wherein the multiple distinct locations are simultaneously and serially placed.

7. The method of claim 6 further comprising designating a region of the touch screen as available to receive the another tactile force, such that the another tactile force is algorithmically determinable to be the unlocking gesture when recognized in the designated region.

8. The method of claim 7 further comprising determining a duration of the another tactile force at a particular location of the touch screen to determine whether it is the unlocking gesture.

9. The method of claim 8 further comprising determining that a total time to create the another tactile force is within a permitted amount of time when determining whether it is the unlocking gesture.

10. The method of claim 1 further comprising operating the mobile device in the initial state such that certain functions are disabled in the initial state to conserve battery consumption of the mobile device through a power management circuitry of the mobile device.

11. The method claim 10 wherein the memory is a local memory of the mobile device that is internal to the mobile device.

12. The method of claim 1 further comprising:
determining that a next tactile force is unrelated with the unlocking gesture; and
transforming the mobile device from the initial state to a locked state based on the determination that the next tactile force is unrelated with the unlocking gesture.

13. The method of claim 12 further comprising permitting the mobile device to communicate with an emergency service provider even when in the locked state.

14. The method of claim 1 further comprising:
determining that the unlocking gesture is similar to a stored gesture beyond a tolerance value; and
requesting a different gesture to be stored when the determination is made that the unlocking gesture is similar beyond the tolerance value.

15. The method of claim 1 further comprising determining that the another tactile force is within an acceptance range of associability with the unlocking gesture when associating the another tactile force with the unlocking gesture.

16. The method of claim 1 in a form of a machine-readable medium embodying a set of instructions that, when executed by a machine, causes the machine to perform the method of claim 1.

* * * * *

UNITED STATES PATENT AND TRADEMARK OFFICE
CERTIFICATE OF CORRECTION

| | | |
|---|---|---|
| PATENT NO. | : 8,174,503 B2 | Page 1 of 1 |
| APPLICATION NO. | : 12/122667 | |
| DATED | : May 8, 2012 | |
| INVENTOR(S) | : David H. Chin | |

It is certified that error appears in the above-identified patent and that said Letters Patent is hereby corrected as shown below:

The assignee name is printed incorrectly in the issued patent. The printed Assignee shows as David H. Cain (Menlo Park, CA).

Title page, item [73] Assignee name should be David H. Chin (Menlo Park, CA).

Signed and Sealed this
Third Day of July, 2012

David J. Kappos
*Director of the United States Patent and Trademark Office*